(12) United States Patent
Chan

(10) Patent No.: US 7,129,829 B2
(45) Date of Patent: Oct. 31, 2006

(54) WIDE RANGE REARVIEW MIRROR WITH SIGNAL AND SAFETY LIGHTS

(76) Inventor: Jack Sing Chiow Chan, 11830 Pedernales Falls Ln, Sugar Land, TX (US) 77478

( * ) Notice: Subject to any disclaimer, the term of this patent is extended or adjusted under 35 U.S.C. 154(b) by 214 days.

(21) Appl. No.: 10/793,598

(22) Filed: Mar. 4, 2004

(65) Prior Publication Data
US 2004/0212489 A1  Oct. 28, 2004

Related U.S. Application Data

(63) Continuation-in-part of application No. 10/312,249, filed as application No. PCT/US01/01885 on Jan. 17, 2001, now abandoned.

(51) Int. Cl.
*B60Q 1/34* (2006.01)
(52) U.S. Cl. ............... 340/475; 340/470; 340/474; 340/477; 359/871; 359/850; 362/540
(58) Field of Classification Search ............... 340/472, 340/470–471, 474–475, 476–477; 359/871–872, 359/865–866, 850; 362/540
See application file for complete search history.

(56) References Cited

U.S. PATENT DOCUMENTS

| | | | |
|---|---|---|---|
| 4,331,382 A | 5/1982 | Graff | |
| 4,916,430 A | 4/1990 | Vu | |
| 5,059,015 A | 10/1991 | Tran | |
| 5,321,556 A | 6/1994 | Joe | |
| 5,371,659 A * | 12/1994 | Pastrick et al. | 362/494 |
| 5,594,594 A * | 1/1997 | Ung | 359/855 |
| 5,793,542 A | 8/1998 | Kondo et al. | |
| 5,805,367 A | 9/1998 | Kanazawa | |
| 5,851,064 A * | 12/1998 | Lyons | 362/494 |
| 5,879,074 A * | 3/1999 | Pastrick | 362/494 |
| 6,049,271 A | 4/2000 | Chu | |
| 6,069,755 A | 5/2000 | Li | |
| 6,076,934 A | 6/2000 | Gerdes | |
| 6,099,153 A | 8/2000 | Zimmermann | |
| 6,398,377 B1 | 6/2002 | Chou | |
| 6,416,208 B1 | 7/2002 | Pastrick et al. | |
| 6,426,485 B1 | 7/2002 | Bulgajewskim | |
| 6,488,382 B1 | 12/2002 | Mertens | |
| 6,505,944 B1 * | 1/2003 | Lewis | 359/864 |

(Continued)

FOREIGN PATENT DOCUMENTS

GB   2 092 534 A   9/1992

*Primary Examiner*—Jeffery Hofsass
*Assistant Examiner*—Daniel Previl
(74) *Attorney, Agent, or Firm*—Browning Bushman P.C.; Hugh R. Kress

(57) ABSTRACT

A module with various designs of signal and safety lights incorporated with a wide range rearview mirror for the exterior sides of motor vehicles. Within the module(s), a signal light(s) and a safety light(s) of varying shapes are included. The rearview mirror cover edge for the module mounting onto is designed with a curvature bending angle of at least 128 degrees within the range of 91 degrees to 180 degrees for the flashing of the signal light(s) and illumination of the safety light(s) can be seen from the rear, the side and the front. The wide range rearview mirror is a ¼ (25%) curvature reflective mirror in combination with a ¾ (75%) flat reflective mirror. This combination mirror provides minimal distortion while allowing a widened scope of view to cover the blind spot.

19 Claims, 28 Drawing Sheets

U.S. PATENT DOCUMENTS 6,520,690 B1   2/2003   Chu
6,695,465 B1   2/2004   Apfelbeck
6,749,235 B1   6/2004   Crisp
6,788,217 B1   9/2004   Pederson

* cited by examiner

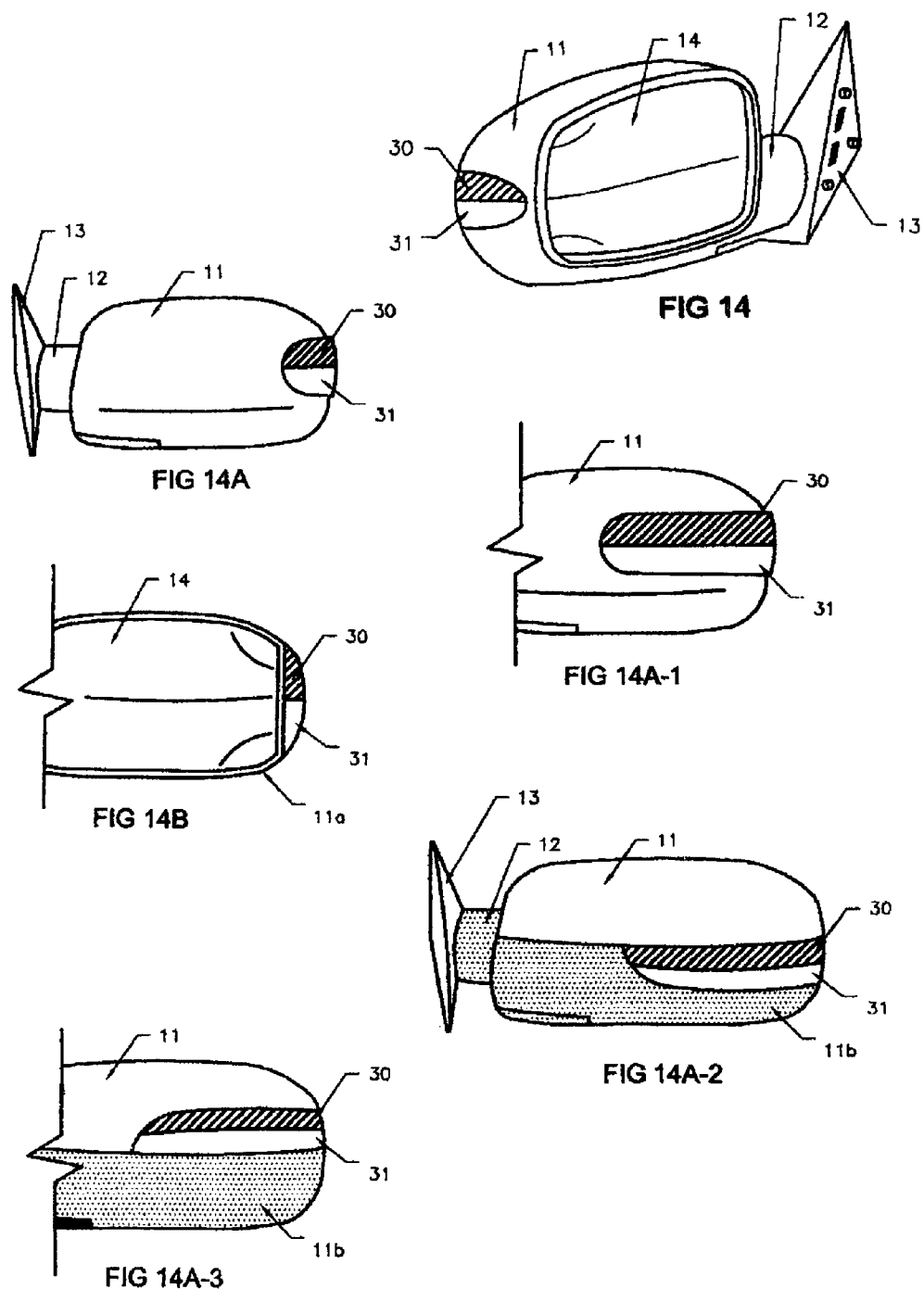

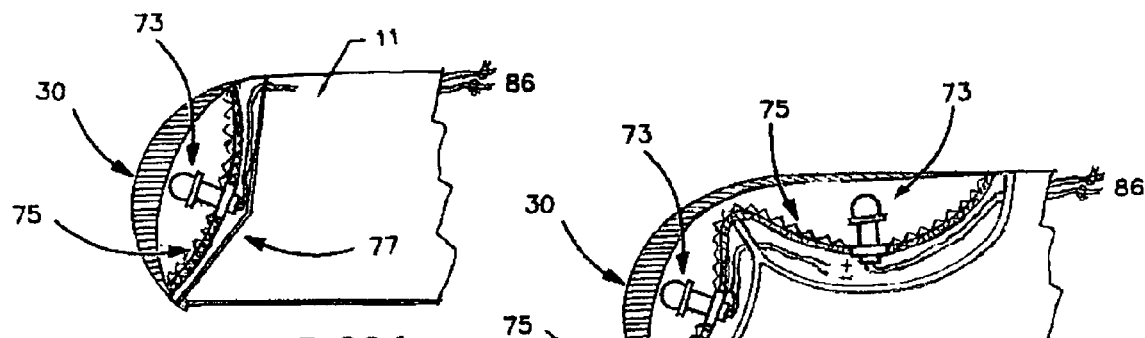
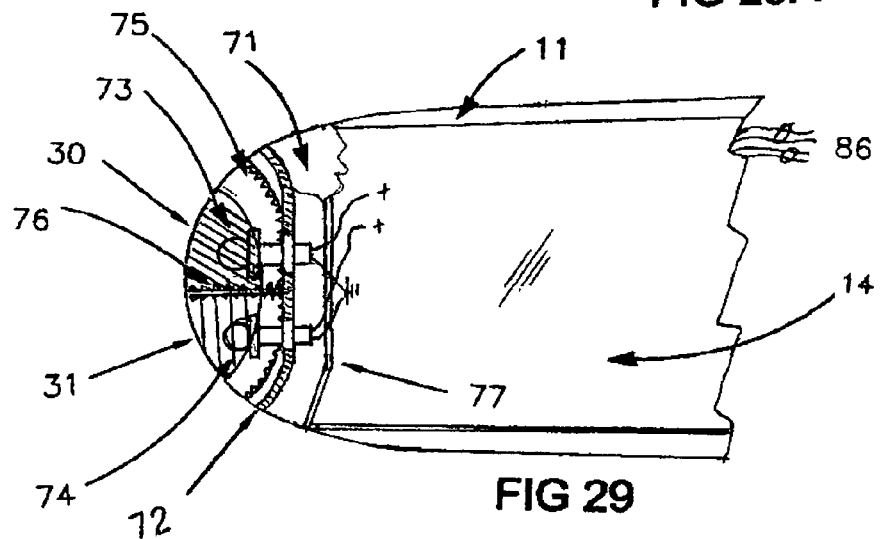

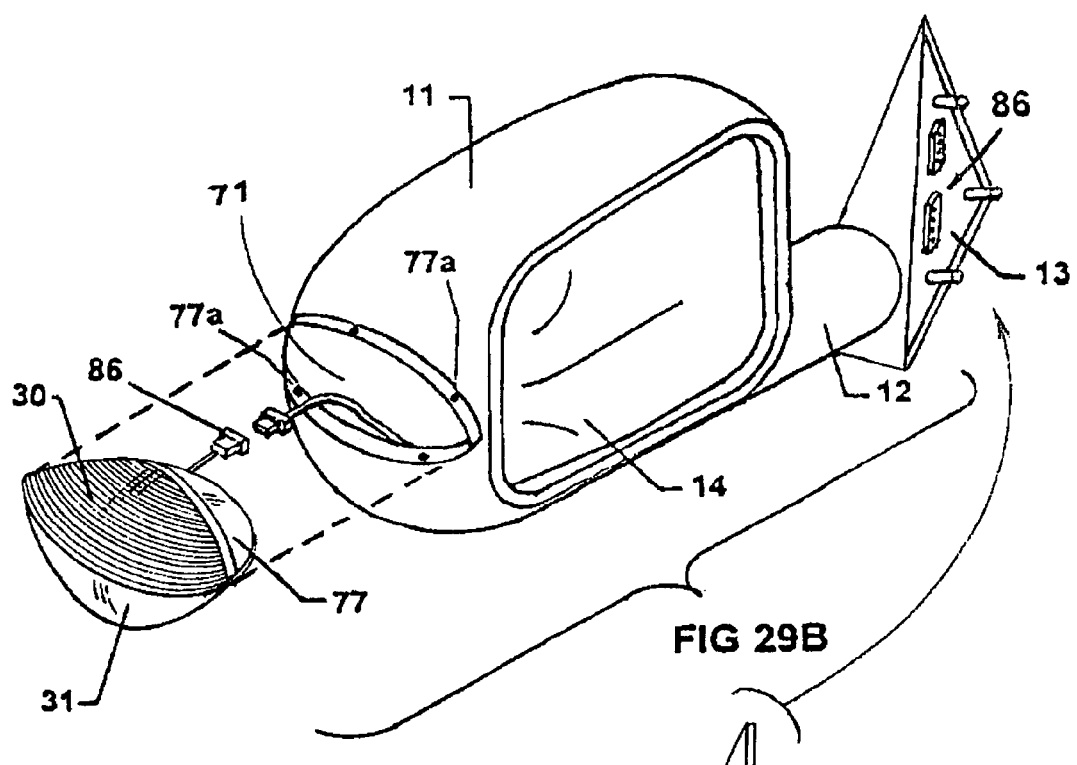
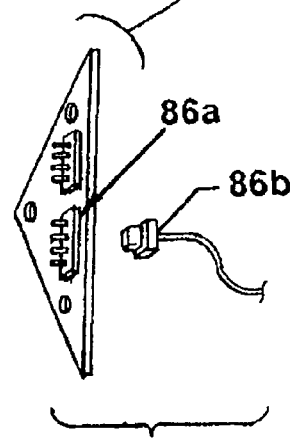
FIG 29B
FIG 29C

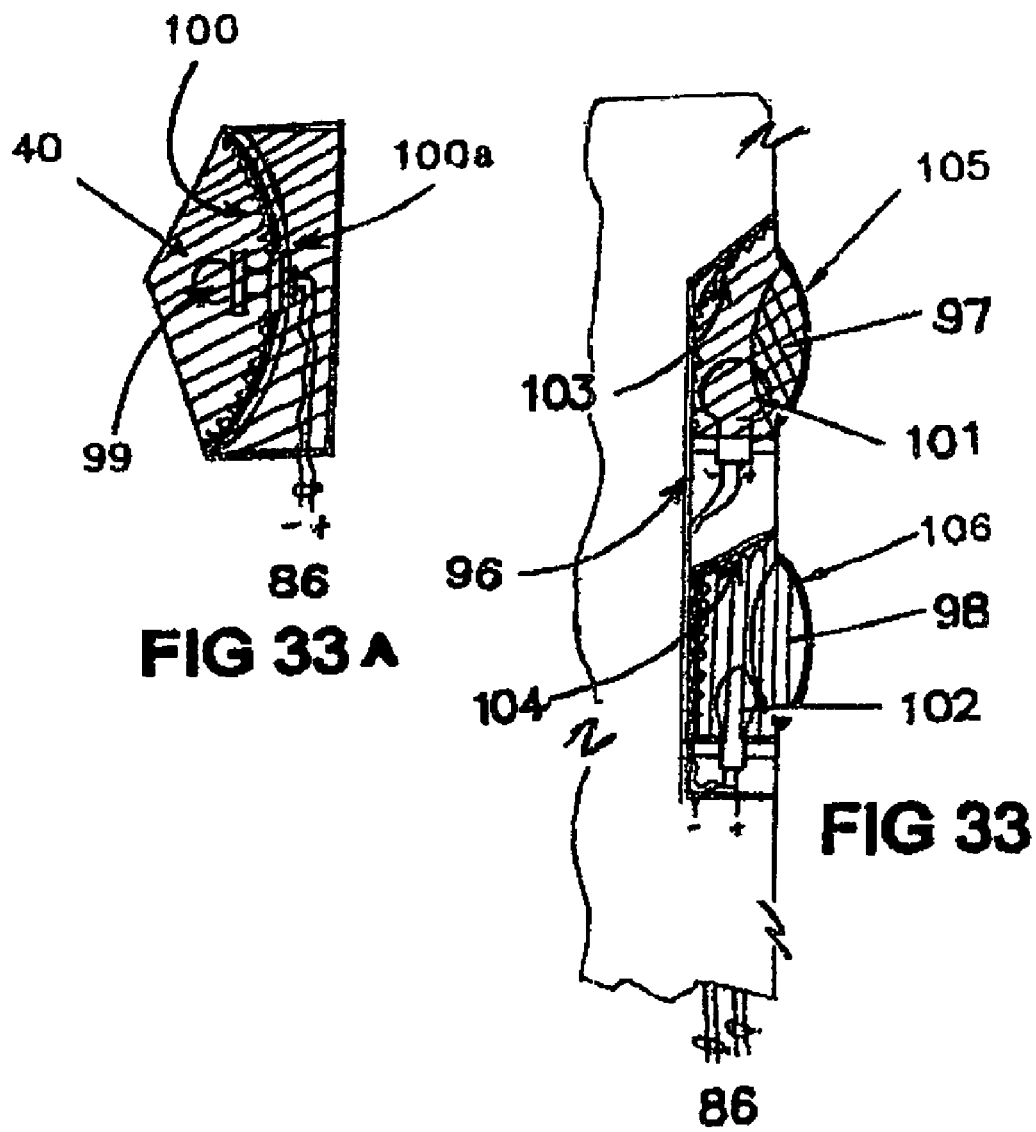

WIDE RANGE REARVIEW MIRROR WITH SIGNAL AND SAFETY LIGHTS

CROSS REFERENCE TO RELATED APPLICATIONS

This application is a CIP of Ser. No. 10/312,249 Dec. 23, 2002 ABN which is a 371 of PCT/US01/01885 Jan. 17, 2001.

FIELD OF THE INVENTION

The present invention is related to providing a signal and safety light system to the exterior rearview mirror for motor vehicles. The module of the signal and safety light system is mounting onto a wide range rearview mirror which is a combination of ¼ (25%) curvature mirror with a ¾ (75%) flat reflective mirror for covering the blind spot.

BACKGROUND OF THE INVENTION

There are many inventive products in the market attempting to solve the problem of a blind spot of the flat rearview exterior mirror of motor vehicles. There are currently two groups of rearview mirrors for motor vehicles. One is the spherical, arc curve mirror or combination mirror. This group of mirrors only deals with blind spots with distortion and does not include signal lights. The second group is the rearview mirrors that incorporate a signal light. These mirrors are conventional flat mirrors which do not cover the blind spot. The present invention covers two aspects; one is to provide a wide range rearview mirror to cover the blind spot and another is to provide signal and safety light system to the rearview mirror as a complete system for safety driving.

Round shape spherical mirrors and arc curve mirrors of different sizes are available. They serve the purpose of covering the blind spot with the effect of creating significant distortion of the image.

Presently, there is a design of rearview mirrors with the bend curve gradually extended to both sides of the edges of the rearview mirror. The curvature point of this arc curve convex reflective mirror is at the center. This was disclosed by U.S. Pat. No. 6,076,934, an arc curve rearview mirror, which has been installed at the right side of the new vehicles. Though it covers the blind spot, the side effect is that considerable distortion occurs and the manufacturer must warn the drivers concerning the distortion effects. U.S. Pat. No. 6,398,377B to Min-Hwa Chou discloses that an external wide-angle rearview mirror integrated with a main zone approximately 30% surface with a predetermined curvature extends gradually to the upper and lower edge. It can be observed that the curvature portion is about 70% of the designed mirror. This is a slight improvement over the arc curve mirror. U.S. Pat. No. 6,069,7055 to Chiging Li reveals that this rearview mirror has a convex reflecting surface with distortion.

There are many other convex and spherical mirrors installed on motor vehicles. The reflective areas of these mirrors are more extensive than a conventional flat mirror. The additional view gained through the convex and spherical reflective surface causes distortion in size and distance. There are other rearview mirrors with combination of a curvature mirror at the edge to cover the blind spot. One example is U.S. Pat. No. 4,331,382 by Graff. This rearview mirror is a combination of a curvature reflective convex surface mirror of ⅖ (40%) in length with bending curve of 10° as a composite to a main convex reflective mirror of ⅗ (60%) in length. Another is the invention of Kanazawa's U.S. Pat. No. 5,805,367. This rearview mirror is a multi-functional rearview mirror having a wide visibility and an anti-glare function. The composition of this rearview mirror is a curvature mirror with the width of ⅓ length (33%) of the rearview mirror joined as a composite to the planar reflective mirror of ⅔ (67%) in length. The curvature mirror and the main planar reflective mirrors are convex surfaced. There are many other convex curvature mirrors and main planar convex reflective mirrors such as Joe's U.S. Pat. No. 5,321,556 and U.S. Pat. No. 5,793,542 to Kendo et al. Though an increased view can be gained by the convex surface, this causes significant distortion.

There are a few related inventions with signal indicators mounted onto the rearview mirror or with signal indicators under the mirror surface operating through electrical heating system. The Patent Application Publication, US 2001/0046136A1 on Nov. 29, 2001 revealed a strap shape of module of signal light in crystal white which is mounted onto the front cover of a rearview mirror. The flashing of the signal is through the LED assembly and it can be observed from the front and side but not the rear. The U.S. Pat. No. 6,426,485B provides a heater system for a diffused lighted signal to the mirror assembly. This light diffusing signal can only be seen by the vehicles at the rear and not the vehicles in front. The U.S. Pat. No. 6,416,208 B2 to Patrick et al provides an exterior mirror system incorporated with a signal light and a flood light inside the exterior rearview mirror. The signal light is within the view of the driver.

There are still other rearview mirrors with signal lights for vehicles. One is the U.S. Pat. No. 6,099,153 granted to Zimmerman et al on Aug. 8, 2004 revealing a strap shape of signal light outlet opening at the front cover similar to U.S. Patent Application US 2001/0046136 A1. Another related invention is U.S. Pat. No. 6,695,465 B2 granted to Apfebeck on Feb. 24, 2004. And yet another U.S. Pat. No. 6,749,325 B2 granted to Bukosky et al on Jun. 15, 2004 has its signal light seen by the driver similar to an earlier patent. This invention of a signal assembly includes a plurality of light emitting diodes in the mirror surface for flashing of signals. This is quite similar to the earlier U.S. Pat. No. 6,426,485 B, except it covers three directions and the signal light is electromagnetic radiation.

At present, existing rearview mirrors for the left side of a vehicle are flat mirrors with a blind spot. The driver may not be able to see vehicles in the blind spot and accidents can occur if the driver is not careful. Existing rearview mirrors for the right side of a vehicle are commonly curved in an arc, which distorts the image in size and perceived distance. Tragedy could occur if the driver is not alert. The present invention is intended to remedy the above and other perceived deficiencies in the prior art.

BRIEF SUMMARY OF THE INVENTION

There are two aspects of this invention, one is to provide a wide range view to the exterior rearview mirror covering the blind spot with minimal distortion effects and the other is to simultaneously provide a module of a signal and a safety light system to the rearview mirror as a complete system for the improved safety of the drivers of motor vehicles. In pursuit of excellence, a wider angle of the mirror edge has been designed to accommodate the specially designed module of signal light and safety light. The signal and safety light system for the invention have been designed in many patterns for personal choice and aesthetic reasons.

The flashing signals of any of the signal light patterns of the invention can be seen from the vehicles at the rear, at the side lanes and at the front of the vehicle. The signal light is hidden behind the mirror cover and does not glare the eyes of the driver and thus driving safety is enhanced.

This unique model covers three areas; First, elimination of the blind spot, Second, addition of a turning signal, and Third, addition of a safety light for safe driving at night. There are several advantages of this invention including:

1. This invention provides the best combination of a curvature reflective mirror of ¼ (25%) and a flat reflective mirror at ¾ (75%). This invention reflects images without distortion through the flat reflective mirror and covers the blind spot with negligible distortion with the aid of the curvature reflective mirror. The ratio of curvature reflective mirror to a flat reflective mirror has been determined through a computer Curve Fitting Program. Scientifically and methodologically, this invention is the most effective rearview mirror.

2. The Wide Range Rearview Mirror incorporated with the module of signal light and safety light should be installed with a mirror edge of between 91 and 180 degrees and preferably at 128° and 160° angle to increase the visibility of the flashing of signal light and the lumination of safety light. Especially for motorcycles, an angle of at least 160° is preferred for greater visibility. The flashing signals can be seen from the front of the vehicle, the side lanes and the rear without glaring the eyes of the rider.

3. The illumination of the safety light at night has been provided to aid those drivers who are traveling on a two direction, two lane roadway to help them judge the size of approaching vehicles traveling towards each other so as to avoid collision. Simultaneously, this invention enables the drivers of a passing vehicle going the same direction to be aware of the size and location of a vehicle as they are traveling past the vehicle.

Four Patterns of the signal and safety light system of the rearview mirrors have been designed with multiple variations within each Pattern. Pattern I shown in FIG. 14 and in FIG. 29A includes a module of signal and safety light system in oval shape. This has been designed and would be used for most automobiles.

Pattern Ia includes two light outlets of signal light and safety light in strap shape as indicated in FIG. 14A-1 and FIG. 29A-1

Pattern Ib is the strap shape module of signal light and safety light mounted on to the lower part of the front mirror cover as depicted in FIG. 14A-2.

Pattern Ic is the strap shape module of signal light and safety light mounted onto the upper part of the front mirror cover as shown in FIG. 14A-3.

Pattern II can be seen in FIG. 15A and FIG. 30 and includes a safety light and signal light as well as one safety light in round shape in the front of the mirror.

Pattern IIa can be seen in FIG. 15B and FIG. 31. This includes a signal and safety light system with two signal light outlets in round shape with one in an arrow image mounted to the edge cover and one safety light in round shape mounted to the mirror cover respectively.

Pattern IIb can be seen in FIG. 15C and FIG. 32. This includes a signal and safety light system with two signal light outlets in round shape with one in an arrow image, and two safety outlets in the front of the mirror cover in round shape.

Pattern IIc includes a signal and safety light system wherein the signal lights and safety lights are illuminated by LED Super Beam with one bulb for one outlet in a module of strap shape as indicated in FIG. 15D and FIG. 15D-1.

Pattern III has been designed for use with buses, trailers and other large motor vehicles with one module of signal light and another module of signal and safety light respectively mounted to the edge cover and the front cover of the mirror as depicted in FIG. 17, FIG. 18, FIG. 18A, FIG. 33, FIG. 33A and FIG. 33B.

Pattern IV shown in FIG. 36 is a smaller version designed for motorcycles and scooters however they may also be used by other vehicles. FIG. 36A, FIG. 36B, FIG. 36C, FIG. 37 and FIG. 37A show variations of Pattern IV. The angle is increased to at least 160 degrees for greater visibility from the rear as shown in FIG. 37B.

This invention is unique in providing these features. It is a break-through model, multifunctional and unique device for improving driving safety on the road. As shown in this specification, this invention applies to the exterior rearview mirrors for cars, trucks, vans, buses, motor homes, motorcycles, scooters and other motorized vehicles.

BRIEF DESCRIPTION OF THE DRAWINGS

To facilitate a better understanding of the present invention and its advantages, a brief description of the drawings are provided hereunder:

FIG. 8A illustrates the manner of connecting the invented mirror to the body of a conventional exterior rearview mirror.

FIG. 14 depicts the elevation view of the preferred embodiment of the invention showing the module of signal light and safely light mounted according to Pattern I.

FIG. 14A is a front view of the mirror cover showing the module of safety and signal light.

FIG. 14A-1 shows another front view of the mirror cover indicating an alternate variation of the module of signal light and safety light.

FIG. 14B is showing the module of signal light and safety light viewed from the rear.

FIG. 14A-2 depicts the strap shape module of signal light and safety light mounting onto the lower part of the mirror cover.

FIG. 14A-3 shows the strap shape module of signal light and safety light mounting onto the upper part of the mirror cover.

FIG. 15-1 is another pattern of the module of signal light which is in round shape arrow image.

FIG. 15D-1 is the side view of Pattern IIc.

FIG. 25A is the front view of its safety light illuminating pattern showing the variation of module from FIG. 15B.

FIG. 29 is the perspective view and cross section view of the module for a signal light and a safety light according to Pattern I.

FIG. 29A is the top view and cross section view of the module for signal light and safety light according to Pattern I.

FIG. 29A-1 is the top view and cross section view of the module of signal and safety light showing two LED bulbs according to Pattern I.

FIG. 29B illustrates the exploded perspective view of an integrated module of signal light and safety light assembly.

FIG. 29C shows the designed connecting panel base with the signal and safety light sockets for easy installation and power connection of the vehicle.

FIG. 33 is a perspective view of the module of signal light and safety light for buses and trailers according to Pattern III.

FIG. 33A indicates the module of signal light for the edge cover of the mirror.

DETAILED DESCRIPTION OF THE INVENTION

Figure 1:
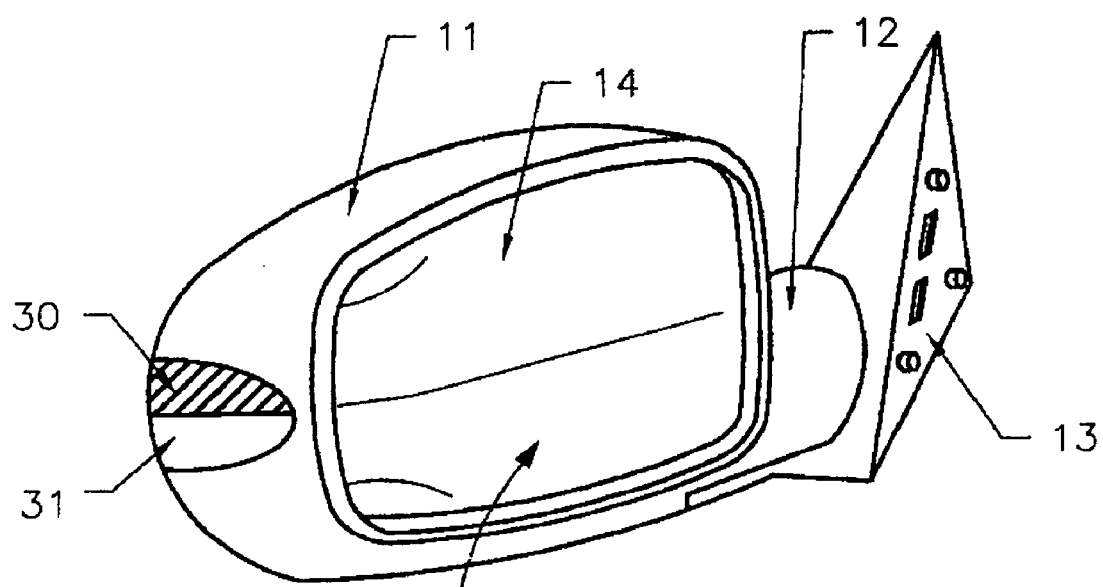
FIG. 1 depicts the perspective view of the invention with the module of signal light and safety light.

FIG. 1 depicts the appearance of the invention incorporated with a module of signal light (30) and safety light (31) system fixed with mirror cover (11), holder (12), and hanger (13) for connecting to the vehicles. The rearview mirror is installed with the composite mirror (14). This curvature mirror is for the left side of vehicles. The replica for curvature mirror at the right is for the right side of the vehicle.

Figure 2:
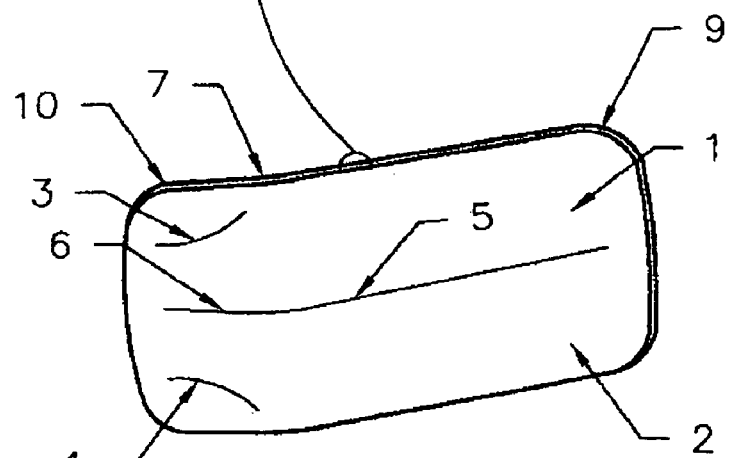
FIG. 2 depicts the mirror with the composite curvature reflective mirror and flat reflective mirror.

FIG. 2 depicts the Wide Range Rearview Mirror in plane view in accordance with the invention. This rearview mirror is a flat reflective mirror in ¾ (75%) horizontal length (9) to (7), extended with a curvature mirror in ¼ (25%) horizontal length (7) to (10). (1) represents the upper flat corner and (2) represents the lower flat corner. The main zone is (5) and gradually extends to the central curve (6). (3) is the upper edge of the curvature mirror and (4) is the lower edge of the curvature mirror. The upper curve (3) and lower curve (4) with the central curve (6) form a complete curvature mirror which gradually and smoothly join with the main zone (5) at the point (7). The objects reflecting from the main zone do not exhibit any distortion effect. The objects reflected in the side curve zone to the left of point (7) will cause only neglible distortion. With this wider scope, the existing blind spot for a driver is eliminated.

Figure 3:
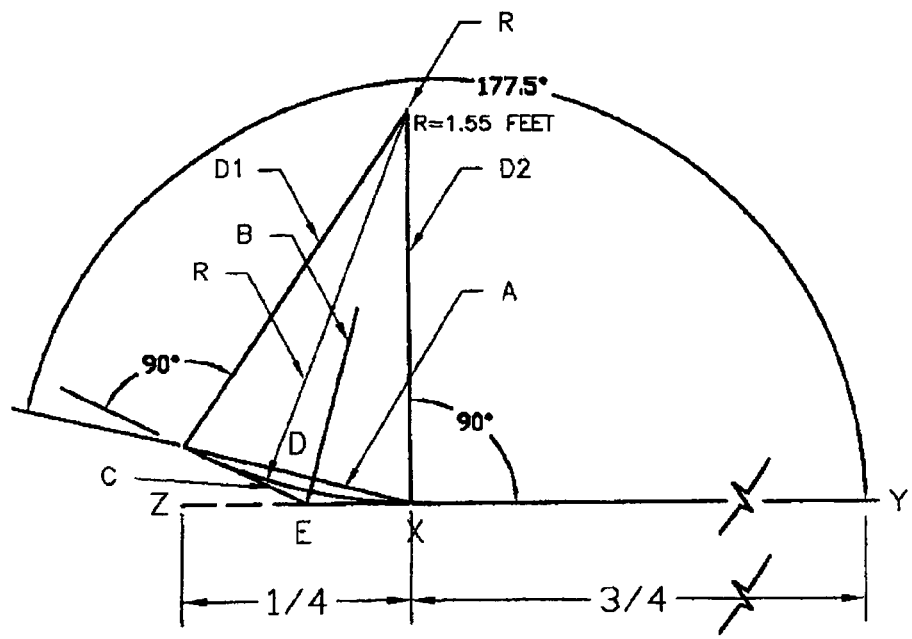
FIG. 3 illustrates the inventive steps of obtaining the curvature radius for the bending curve portion of the composite mirror.

FIG. 3 illustrates the steps in obtaining the radius for the curvature mirror. It is to create a bending curvature tangent to its flat mirror. Assume that the line XY is a straight line and (75%) portion of line ZY. In order to create a curvature, an angle of 177.5° (or alternatively between 176° and 179°) is created at point X and extended as line A. At the center XA, draw a 90° vertical perpendicular line B and extended to E. Next, make a line C with 90° from the intersection of point E. Then make a line $D_1$, from the intersection point and perpendicular to line C. Next, make a line $D_2$ from the end point of ¾ (75%) of flat mirror perpendicular to line XY. The intersection point of the line $D_1$ and line $D_2$ is the center of the mirror's curvature of ¼ of the mirror horizontal length. The curvature radius is obtained for a mirror of 6½ inches with ¼ (25%) bending curvature. The curvature radius is the line R which is approximately 18 inches. The angle of the bending curve is 2.5°. The drawing is not according to scale, for illustration only. Once the curvature radius is known, then the curvature of the bending curve line of the invention can be drawn. Once the Bending Curve Degree, the Curvature Radius, and the size of the Wide Range Rearview Mirror are determined, the mold of the mirror can easily be made through a Solid Work Program for prototype and production.

Figure 4:
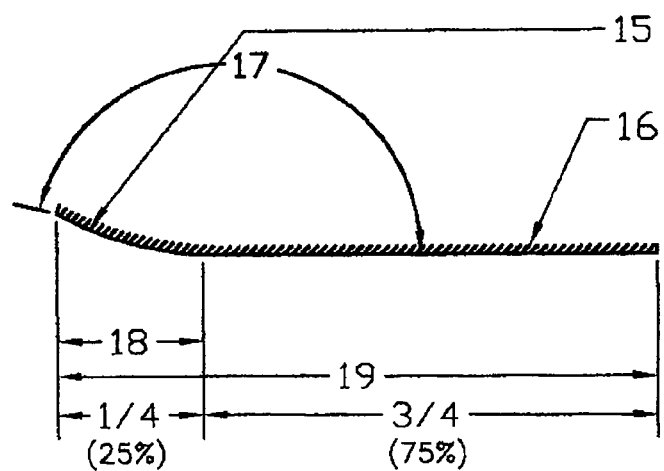
FIG. 4 depicts the bending length of mirror in horizontal length

FIG. 4 indicates the ¼ Bending Length of Mirror horizontal length in which (15) indicates ¼ (25%) mirror bending curvature tangent to the ¾ (75%) flat portion. (16) is the flat reflective mirror, (17) is the mirror Bending Angle between 176° and 179°, (18) is the ¼ mirror horizontal length and (19) is the designed mirror horizontal length (6.5 inch). The mirror Bending Curvature radius is 18 inches for a mirror of 6.5 inches.

Figure 5:
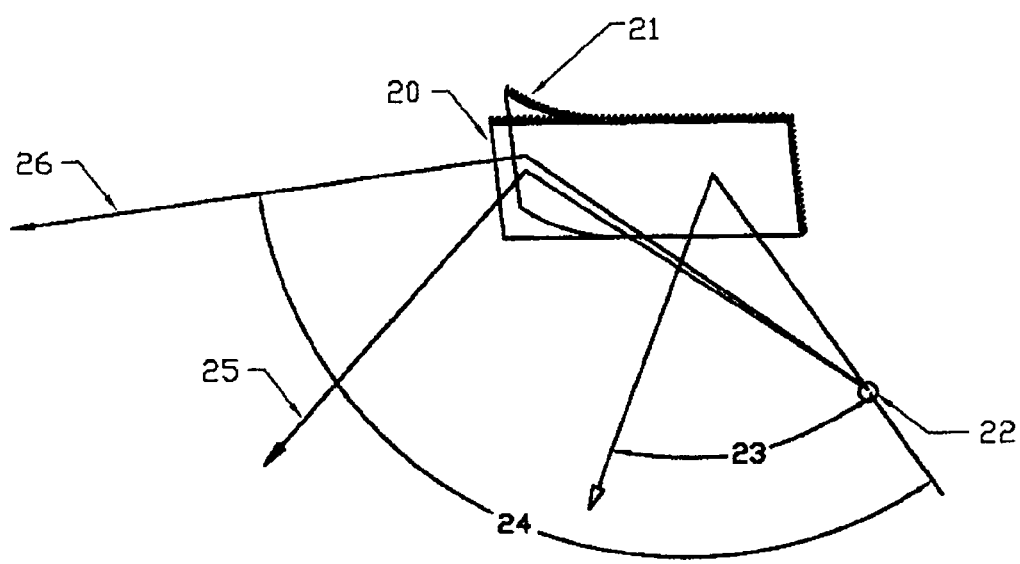
FIG. 5 is a comparison view range of a flat mirror with the invention showing the end bending curvature.

FIG. 5 illustrates a comparison to a flat mirror. In the diagram, (20) represents a flat mirror and (21) is a reflective mirror with Bending Curvature at end portion. Wherein (22) is the position of eye sight, a smaller scope of view (23) of the flat mirror is provided due to the smaller reflective angle. Whereas this invention provides a wider scope of view (24) due to the End Bending Curvature, the scope gained is between line (25) and line (26) which is the blind spot area. Because of this gained wider view, approximately 32%, the present blind spot is covered with a distortion ratio of less than 1–2 feet for a typical 6.5 inch mirror.

Figure 6:
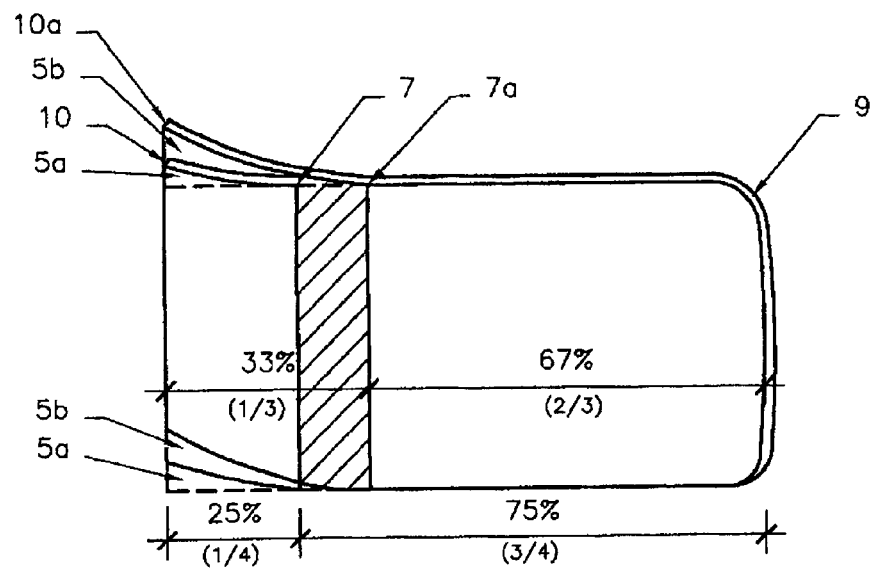
FIG. 6 shows a comparison between the present invention and one of the previous wide angle rearview mirrors.

FIG. 6 illustrates a comparison of two rearview mirrors. One is the present invention and another is a Patent similar to Kanajawa's model with ⅓ (33%) convex curvature mirror as a composite to ⅔ (67%) of a planar convex mirror. We can observe that in this model, the curvature convex mirror is indicated (7a) to (10a) with a bending curve angle of 10° similar to the model of Graff indicated (5b) therein and the planar convex mirror is indicated from (7a) to (9). The present invention with ¼ (25%) of curvature reflective mirror from (7) to (10) at the bending curve angle of 2.5° indicated (5a). The length of the ¾ (75%) flat reflective mirror is indicated from (7) to (9). The area (7) to (7a) marked in lines is the additional flat reflective zone of the present invention where an image could be reflected without distortion. Whereas for the rearview mirror with ⅓ (33%) curvature convex mirror, this is a distortion area. We learn from the spherical reflective mirror, convex reflective mirror and the arc curvature mirror that the more the curvature of the mirror, then results is the more the distortion of image that occurs. Similarly, we do not have to bend the mirror with a bending angle of 8°, 10° or more for the curvature mirror to cover the blind spot which is just at the edge of the mirror. The higher the degree of the bending angle and the more portion of the curvature mirror that exists, the more the distortion of image that will occur. According to the methological calculation with the computer Curve Fitting Program for a rearview mirror of 6½" in horizontal length and irrespective of height, with ¼ (25%) curvature mirror, the fine tuning bending curvature angle is 2.5° with a radius of 18 inches. If the total horizontal length of the reflective mirror is extended to 8", and the curvature mirror remained at ¼ (25%) in length, then the bending curvature angle would be increased to 3.5°. The Wide Range Rearview Mirror manufactured according to this fine tuning design could cover the blind spot fully. From the illustration in FIG. 6, one can observe that the bigger area of curvature reflective mirror will cause more distortion area. The line marked (7) to (7a) area is the additional distortion areas of ⅓ (33%) curvature mirror as compared to the present invention ¼ (25%) curvature mirror. The invention with ⅖ (40%) of curvature reflective mirror provides even greater distortion. The higher the degree of bending angle will result in more distortion of the image. The bending angle of an earlier patent is 10°. The present invention with bending curve angle of 2.5° would reduce the distortion of size and distance to a negligible level. The present invention provides the biggest non-distortion area, flat reflective mirror of ¾ (75%) in horizontal length and the shortest curvature reflective mirror of ¼ (25%) with the lowest bending curve angle of 2.5° for less distortion image while covering the blind spot. The structure of the present invention is based on a calculation with the assistance from computer—Auto Cad—Curve Fitting Program for the best and the most effective model. The rearview mirror of motor vehicles is a safety device; it is essential and fair to provide a most effective rearview mirror to the vehicle owners.

Figures 7, 7A:
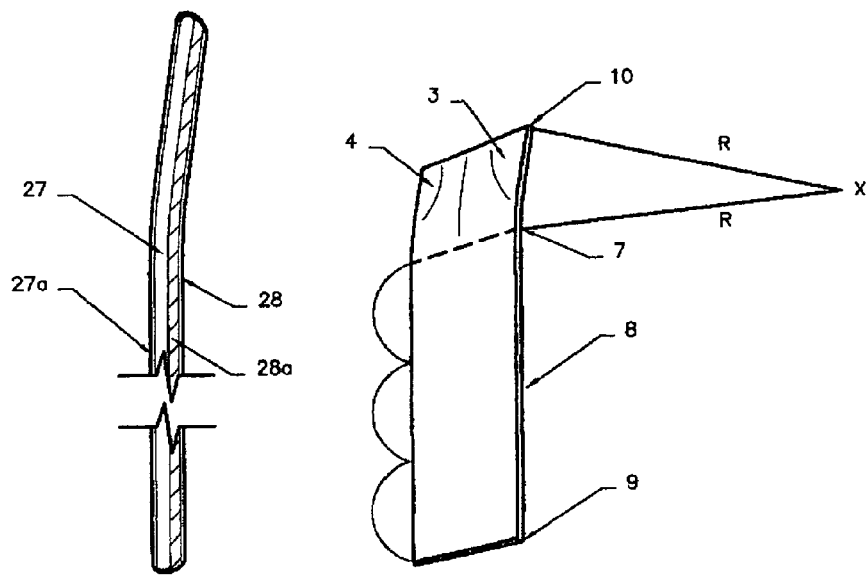
FIG. 7 is the cross sectional side view of the preferred embodiment.
FIG. 7A shows a portion of the cross section view of the mirror surface of FIG. 7.

FIG. 7 is a cross section side view of the preferred embodiment of the invention indicating the radius of the ¼ (25%) portion of the curvature reflective mirror (7) to (10) as composite to a flat reflective mirror ¾ (75%) in horizontal length (7) to (9).

FIG. 7A shows a cross section view of the mirror surface of FIG. 7 in which (27) is the reflective mirror, (27a) is the protective coating; (28a) is the plastic sheet protecting the mirror and (28) is the mounting frame around the mirror.

Figure 8:
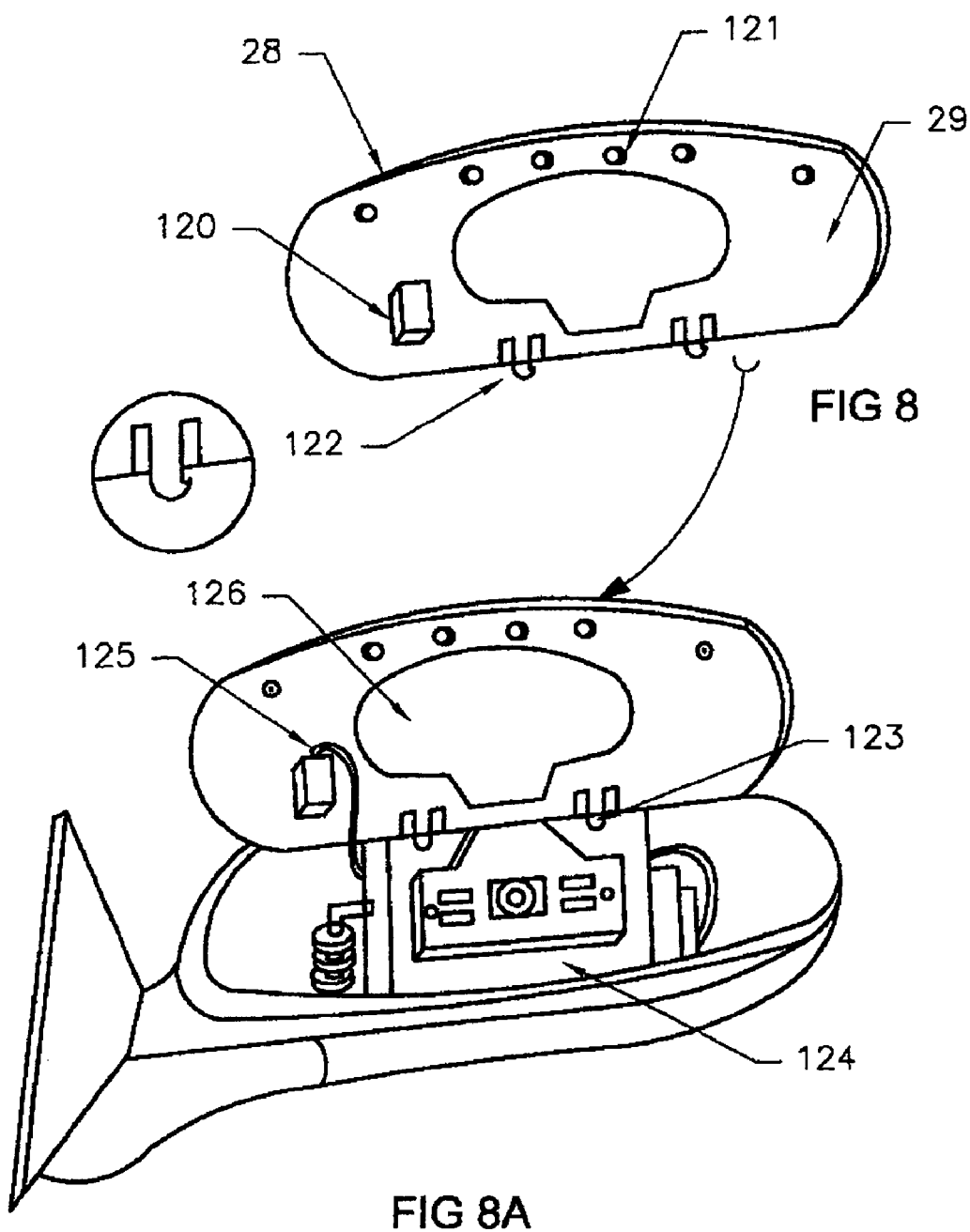
FIG. 8 depicts the design of the mirror frame with the back base.

FIG. 8 depicts the design of the back portion of the mounting frame (28) for the invention in which (29) is the base and (120) is a small box with a wire socket. The four guidenuts (121) are to ensure the right position of the mirror. The mirror position is adjustable and stable. The connective hooks (122) are provided for connecting to the body of the mirror.

FIG. 8A depicts the manner of connecting the invention to the body of a conventional rearview mirror. The back frame is provided with two connective hooks (31) as shown at circle. These hooks are to be attached to the holes provided at the panel (123) which is tied to the installation (124) of the body of the mirror. The holes allow adjustment. The position of the hooks can be designed to fix the existing holes of the panel of the existing body of the mirror for alignment. The control wires (125) and the mirror support (126) are also shown.

Figure 9:
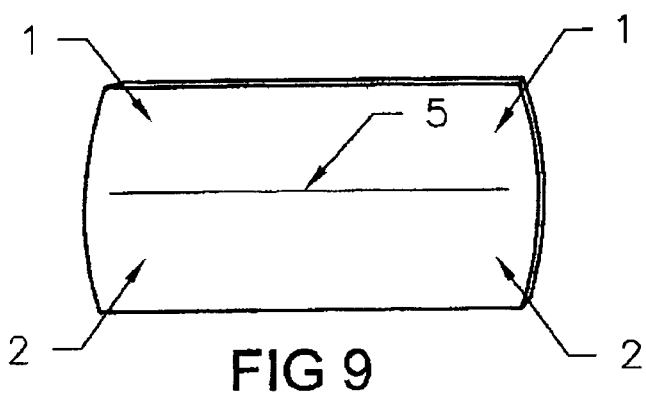
FIG. 9 is an example of a flat reflective mirror.
Figure 10:
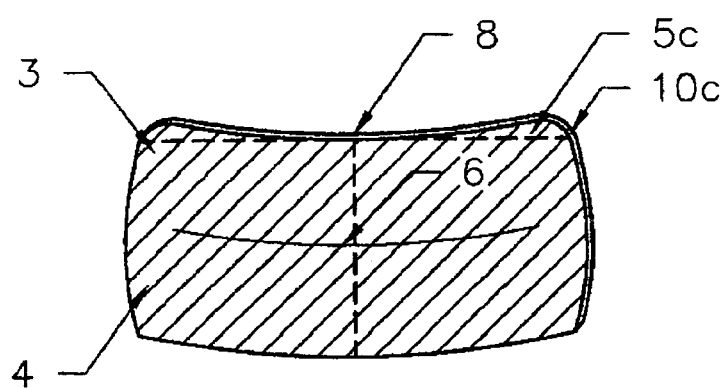
FIG. 10 is an example of a related art arc curve rearview mirror.
Figure 11:
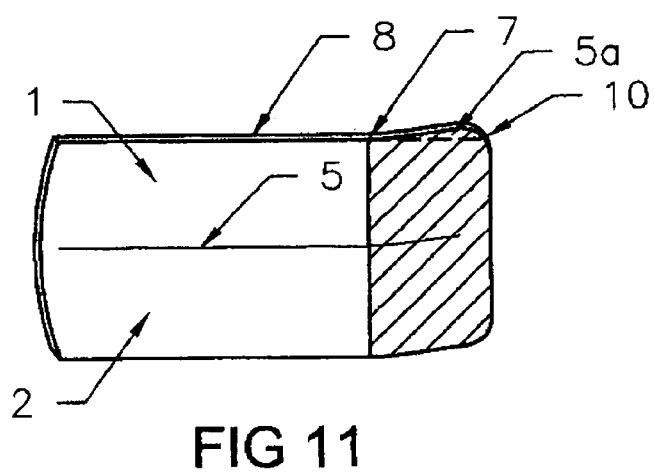
FIG. 11 is the composite mirror showing the curvature reflective portion at the right side for the right side of the vehicles.

A simple comparison of three types of rearview mirrors is presented in FIGS. 9, 10 and 11. FIG. 9 depicts a flat rearview mirror. The flat rearview mirror does not cover the blind spot. (1) represents the upper flat corner, (2) represents the lower flat corner and (5) represents the main zone.

FIG. 10 shows an arc curve reflective mirror with a bending curvature angle (5c) shown extended beyond (10c) from a flat rearview mirror. (3) the upper edge of the curvature mirror and (4) lower edge of the curvature mirror are shown. Also, (8) represents the mid point of the mirror and (6) represents the main curve.

FIG. 11 is the invention with composite of ¼ (25%) portion of the curvature reflective mirror and ¾ (75%) flat reflective mirror with a radius of 18 inches and the bending angle of 2.5° which is (5a), the smallest degree among all the curvature reflective mirrors. The figure also shows the upper flat corner (1), lower flat corner (2), the main zone (5), the point where the curvature begins (7), the midpoint (8) and position (10).

Figure 12:
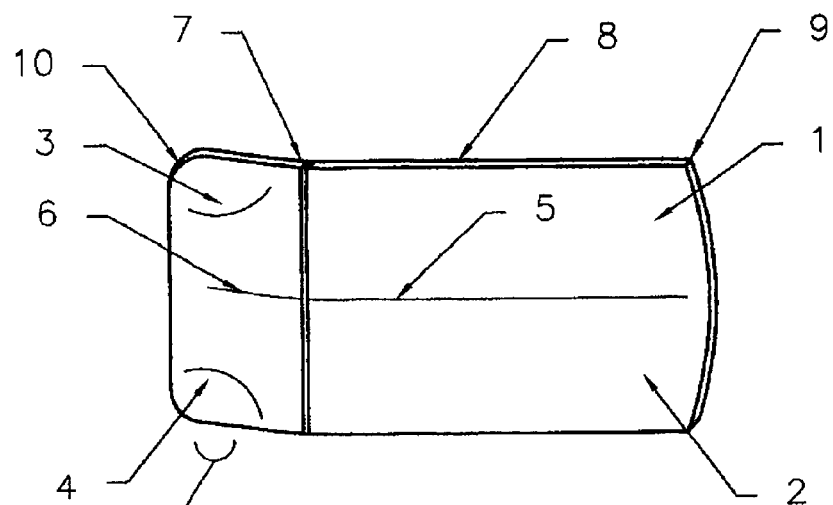
FIG. 12 depicts the composite mirror showing the curvature reflective portion at the left side for the left side of the vehicles.

FIG. 12 depicts the ¼ (25%) curvature reflective mirror separating from the invention and becoming an independent side curvature mirror. The figure also shows the upper flat corner (1), the lower flat corner (2), the upper edge of curvature mirror (3), the lower edge of curvature mirror (4), the main zone (5), the central curve (6), position (7), the midpoint (8), position (9) and point (10).

Figure 13:
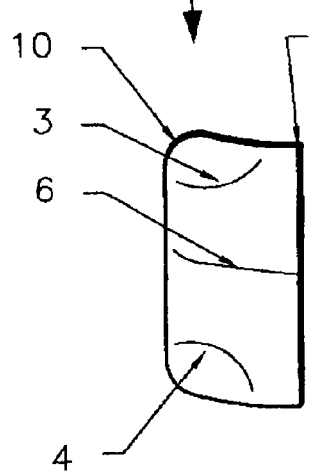
FIG. 13 is the curvature reflective mirror portion
Figure 13A:
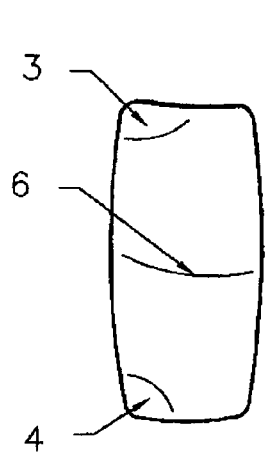
FIG. 13A is a shaped curvature mirror.

FIG. 13 is the side curvature mirror separated from the combination. Also shown is the upper edge of curvature mirror (3), the lower edge of curvature mirror (4), the central curve (6), the point (7) and point (10). FIG. 13A shows the upper edge of curvature mirror (3), the lower edge of curvature mirror (4) and the central curve (6).

Figure 13B:
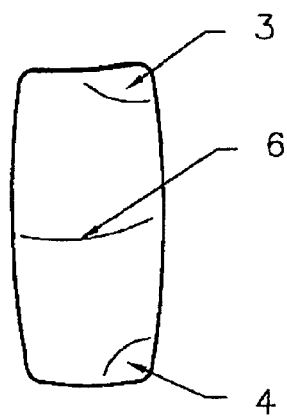
FIG. 13B is another shaped curvature mirror.

FIG. 13B indicates that the side curvature mirrors are shaped nicely for affixing to the existing flat rearview mirror. The figure shows the upper edge of curvature mirror (3), the lower edge of curvature mirror (4) and the central curve (6).

The composite mirror (14) is combined with a signal and safety light system as an added function. The module of signal light and safety light is now mounted onto the mirror housing and the mirror housing is attached to the holder (12) and then to the hanger (13) which is connected to the vehicle.

FIG. 14 indicates the oval shape of the module mounted to the edge of the mirror cover (11). The added light module is installed with two compartments, a signal light (30) is installed at the upper compartment and safety light (31) is installed at the lower compartment. The preferred color for the signal light (30) is Amber Red. The preferred color for the safety light (31) is Amber Yellow or clear white. The signal light should be installed at the extreme edge to avoid the effect of the flashing glaring of the signal light on the driver. It is for the driver's safety and comfort.

With the added function of the mirror, the vehicles following at the rear and at the side lanes can notice immediately the turning signal and thus accidents can be avoided. FIG. 14A shows a variation of the module with a signal light (30) installed in an upper compartment and a safety light (31) installed in the lower compartment. This figure also shows the mirror cover (11), the holder (12) and the hanger (13). This is Pattern I FIG. 14A-1 shows another variation of the module with the signal light (30) and safety light (31) mounted on the mirror cover (11) as Pattern Ia.

FIG. 14A-2 is another variation of the module of signal light (30) and safety light (31) mounting onto the lower part of the front cover (11b) as Pattern Ib.

FIG. 14A-3 indicates yet another variation of the module of signal light (30) and safety light (31) mounting onto the upper part of the front cover (11) as Pattern Ic.

FIG. 14B is the rear view of the invention installed with the module. This figure shows the signal light (30), the safety light (31), the mirror realm (11a), and the holder (12) the hanger (13) and the composite mirror (14).

Figure 14X:
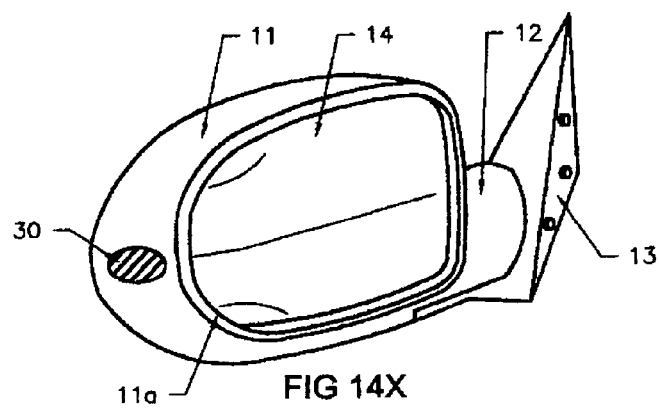
FIG. 14X depicts an oval shaped signal light mounted to the edge cover of the mirror housing.

FIG. 14X depicts an oval shape signal light (30) attached to the mirror cover. This figure also shows the holder (12), the hanger (13) and the composite mirror (14)

Figure 14Y:
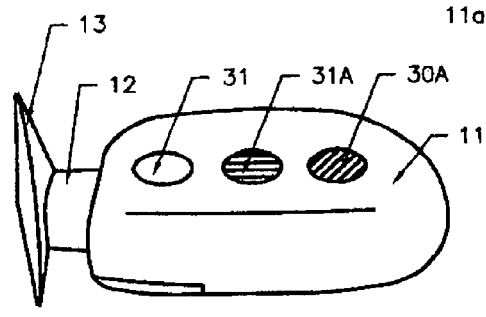
FIG. 14Y is a front view of another pattern of the module of signal and safety light system comprising three lights in oval shapes.

FIG. 14Y shows a front view of another pattern of module with three oval shapes including a safety light (31), an additional safety light (31A) and an additional signal light (30A). This figure also shows the mirror cover (11), the holder (12) and the hanger (13).

Figure 14Z:
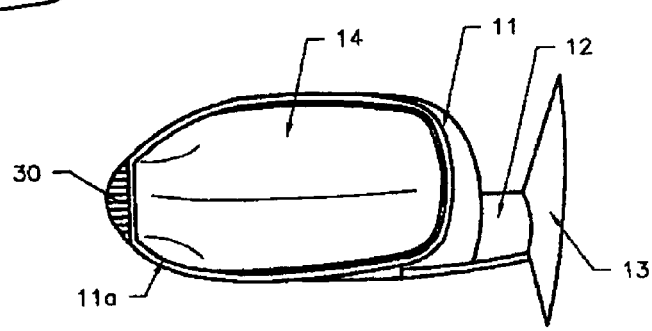
FIG. 14Z is the rear view of the signal light of FIG. 14Y.

FIG. 14Z depicts the rear view of the signal light (30) of FIG. 14Y. The visibility of the signal light is very clear. The figure also shows the mirror cover (11), the holder (12), the hanger (13), the cover realm (11a), and the composite mirror (14).

Figure 15:
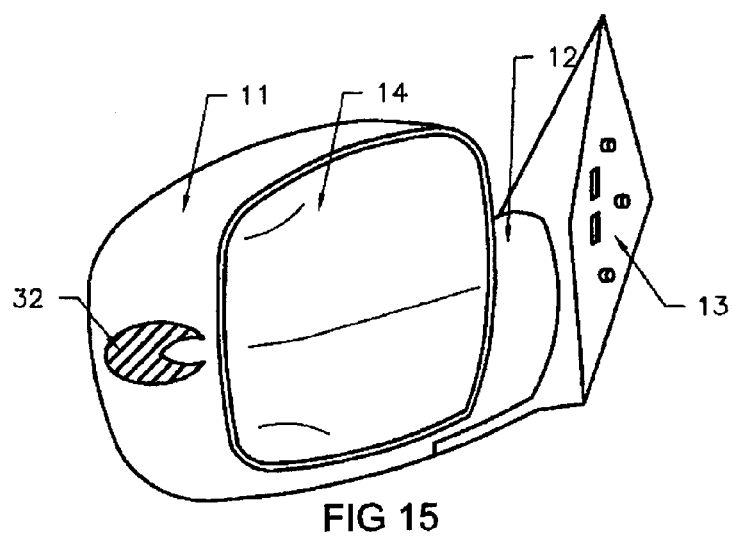
FIG. 15 is a side view of another signal light pattern module in oval arrow image mounted onto the mirror housing of a bigger mirror for van, cruiser and trucks.

FIG. 15 depicts another signal light pattern showing an oval shaped arrow image signal light (32) for trucks, vans, and cruisers. The designed signal light (32) at the edge cover would not glare the eyes of the driver. This figure also shows the mirror cover (11), the holder (12), the hanger (13) and the composite mirror (14). FIG. 15-1 is similar to FIG. 15 except the signal light is in round arrow shape (32b).

Figure 15A:
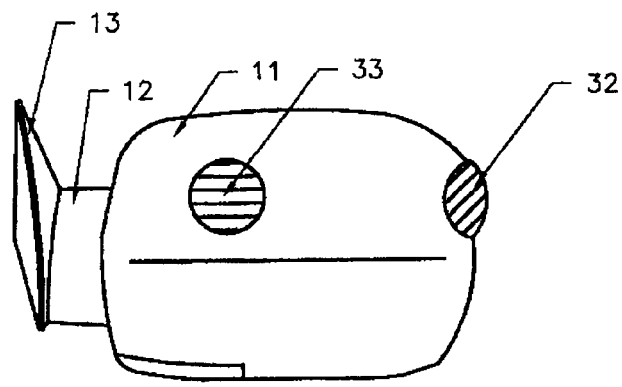
FIG. 15A depicts the front view of the signal light pattern from FIG. 15 as Pattern II.
Figures 1, 15:
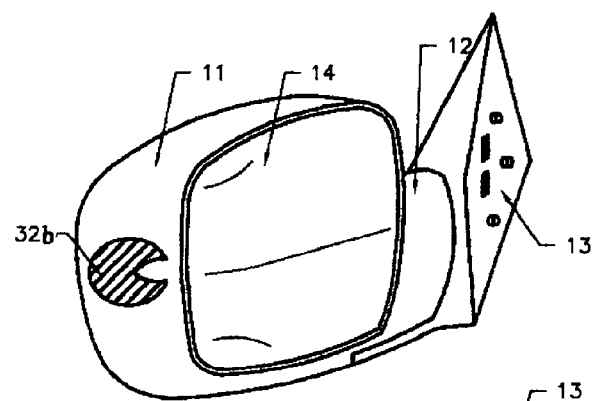

FIG. 15A is the front view of the mirror cover. The oval shaped arrow image signal light (32) can be seen from the front. The safety light (33) is in round shape. The main contribution of this pattern is that the incoming vehicles from opposite direction can judge the size of the vehicle installed with this safety light system. This is critically important when a vehicle is traveling on the two direction, two lane roads in developing countries. Many head-on collisions at night are due to errors in judgment of the drivers on the incoming vehicles. On the narrow two direction, two lane roads without street lights, a huge truck or trailer can be misjudged as cars. More often than not, these huge vehicles encroach into the incoming lane making the situation even worse. The safety light of all patterns of this invention can save lives and avoid tragedies. This figure also shows the mirror cover (11), the holder (12) and the hanger (13).

FIG. 15-1 depicts another signal light pattern showing an oval shaped arrow image signal light (32b) for trucks, vans, and cruisers. This figure also shows the mirror cover (11), the holder (12), the hanger (13) and the composite mirror (14).

Figure 15B:
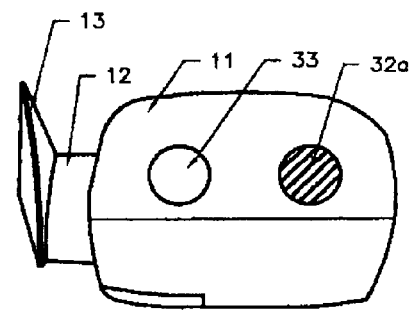
FIG. 15B depicts the front view of the two round shapes within the module of signal light and safety light as Pattern IIa.

FIG. 15B depicts the front view of a pattern for trucks, cruisers and vans mounted with the module with a signal light (32a) and a safety light (33). This figure also shows the mirror cover (11), the holder (12) and the hanger (13).

Figure 15C:
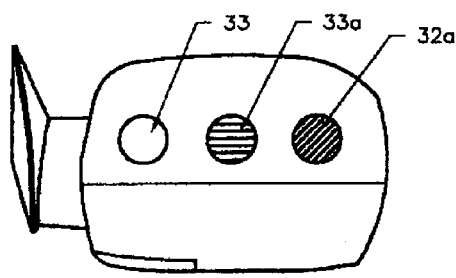
FIG. 15C depicts the front view of another pattern as Pattern IIb.

FIG. 15C is the front view of a pattern with a module with a signal light (32a), a safety light (33) and another safety light (33a).

Figure 15D:
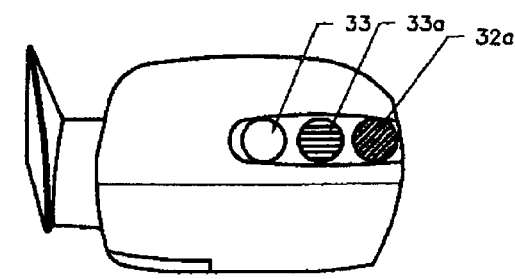
FIG. 15D depicts the front view of another pattern in strap shape as Pattern IIc.
Figures 1, 15D:
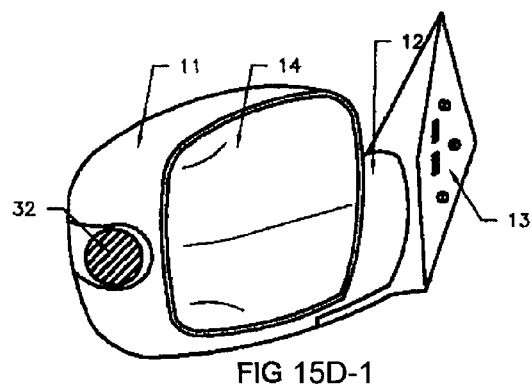

FIG. 15D shows the signal lights and safety in FIG. 15-1 and FIG. 15C are placed in a strap shape module for cost saving and ease of mounting to the mirror cover. The variation is Pattern IIc-1. When the module of this strap shape mounted onto the lower part of the front mirror cover, this variation is Pattern IIc-2. It becomes Pattern IIc-3 when the module is mounted onto the upper part of the front cover.

FIG. 15D-1 is the side view of FIG. 15D, with the signal light (32) in the same strap shape module.

Figure 16:
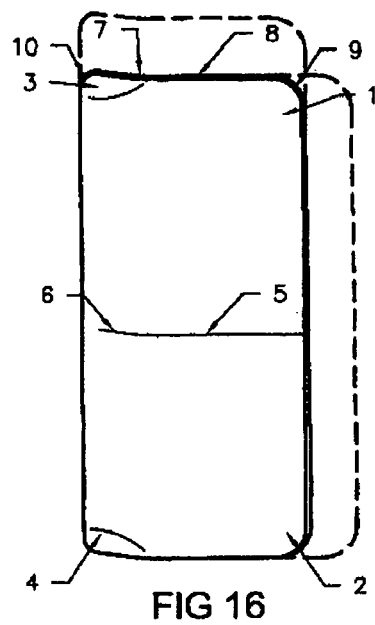
FIG. 16 depicts the invention showing a variation of the mirror and emphasizing that the mirror may be extended both vertically and horizontally for buses, trailers and heavy vehicles.

FIG. 16 is the invention with a rectangular pattern for buses and trailers. It depicts the same combination ratio of a flat mirror and the curvature mirror. Similarly, it has the advantages of the composite mirror for cars and trucks. The size of this composite mirror can be extended vertically and horizontally as and when required. The bigger the size, the wider the visual scope and the blind spot will be covered with negligible distortion. The figure shows the upper flat corner (1), the lower flat corner (2), the upper edge of curvature mirror (3), the lower edge of curvature mirror (4), the main zone (5), the central curve (6), the point (7), the midpoint (8), point (9) and position (10). With the installation of this invention, the buses and trailers can have a full rear view. The mirrors can be designed in various sizes to meet the requirements of buses, trailers and other heavy vehicles. The invention incorporates signal light and safety light system for improved safety on the road.

Figure 17:
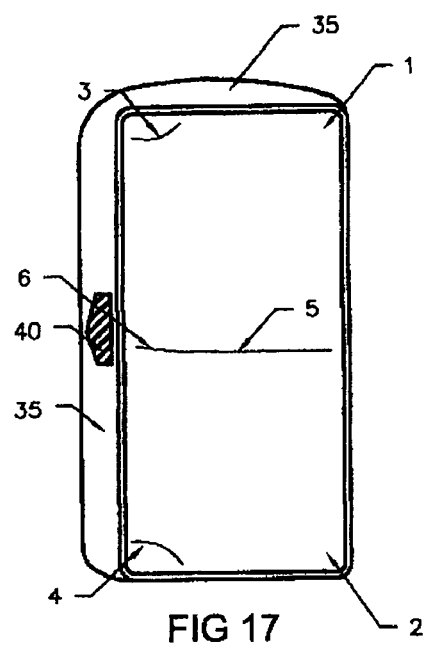
FIG. 17 depicts the rearview of the invention shown in FIG. 16 with a cover and a signal light for buses and trailers.

FIG. 17 shows the perspective view of the invention designed for buses and trailers in the proposed size of 8 inch in horizontal width and vertical length of 16 inch and with the rectangular mirror cover (35) and the arrow shaped signal light (40) for Pattern III. The figure shows the upper flat corner (1), the lower flat corner (2), the upper edge of curvature mirror (3), the lower edge of curvature mirror (4), the main zone (5) and the central curve (6)

Figure 18:
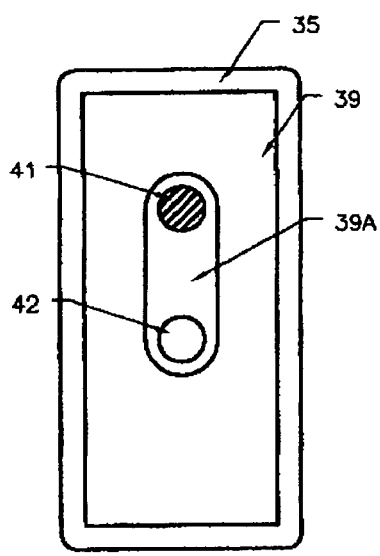
FIG. 18 shows the front view of the invention in FIG. 17 showing a variation of the module of safety light and signal light.

FIG. 18 is a front view of a Pattern III for buses and trailers showing the rectangular edge cover (35), the front cover of the exterior rearview mirror (39), the module (39A) of the signal light (41) and the safety light (42) as Pattern III.

Figure 18A:
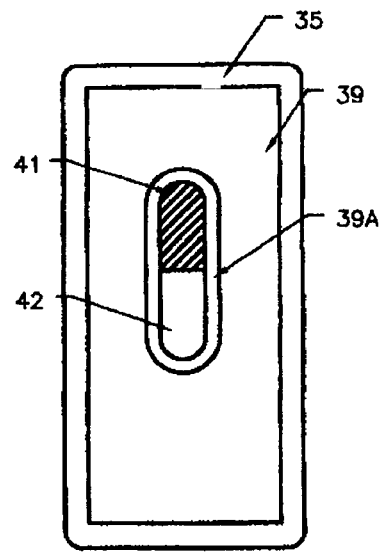
FIG. 18A shows a front view of another variation of the module of signal light and safety light mounted onto the front cover.

FIG. 18A is a variation of Pattern III for buses and trailers showing the rectangular edge cover of Pattern III, the front cover of the exterior rearview mirror (39), the module for (39A) and an alternative revised shape of the signal light (41) and the safety light (42) as an alternate module for Pattern III. The signal light (41) positioned in the upper portion of the module (39A) should be in Amber red and the safety light (42) positioned in the lower portion of the module (39A) should be in Amber yellow or crystal white.

Figure 19:
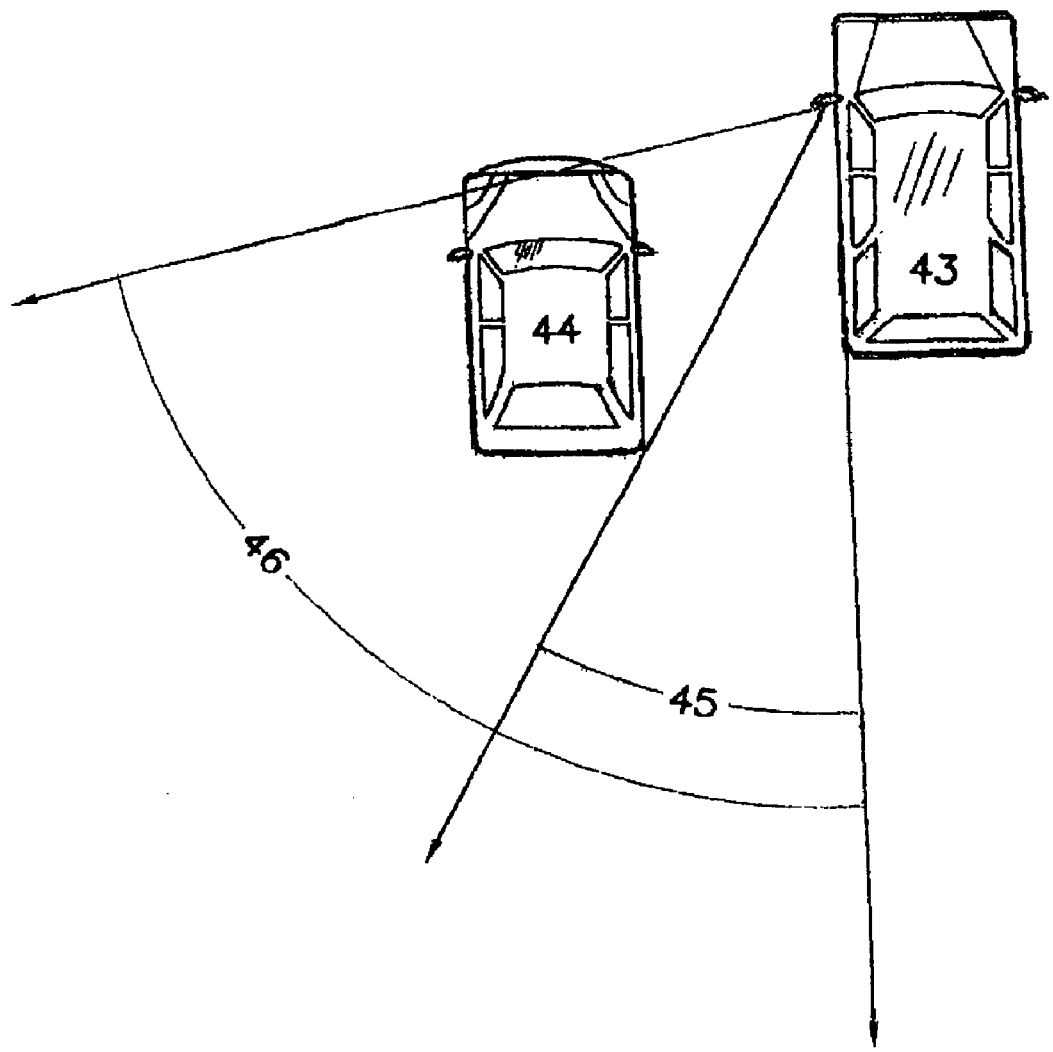
FIG. 19 provides an illustration of the full view of the invention covering the blind spot.

FIG. 19 provides an illustration of the blind spot which is the defect of the traditional flat rearview mirrors. Vehicle (43) is the vehicle with the traditional flat mirror installed. The driver can not see the approaching car (44) because of the rearview range with traditional mirror (45) provides a blind spot. If the vehicle (43) had been installed with the invention, then the visual scope would be extended to rearview range with invention (46), and the blind spot is covered. Accidents while changing lanes can be avoided and the safety on the road can be enhanced.

Figure 20:
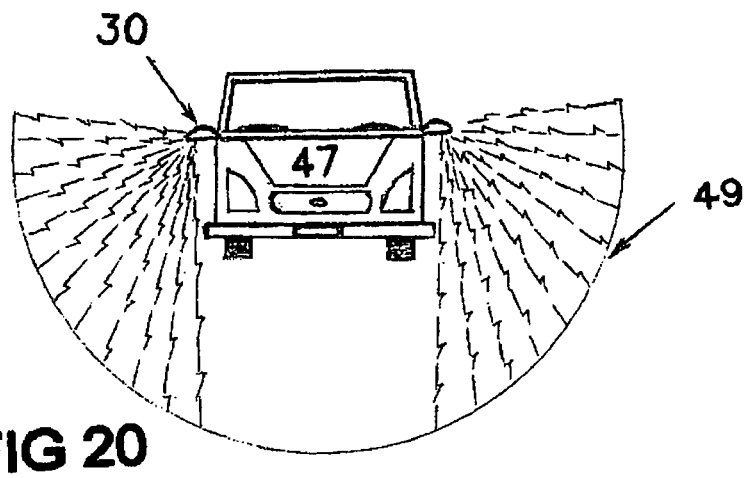
FIG. 20 is the front view of a vehicle illustrating the range of coverage of the signal light.

FIG. 20 shows the vehicle (47) equipped with the invention with signal light (30). This is the front view of the signal light flashing pattern (49).

Figure 21:
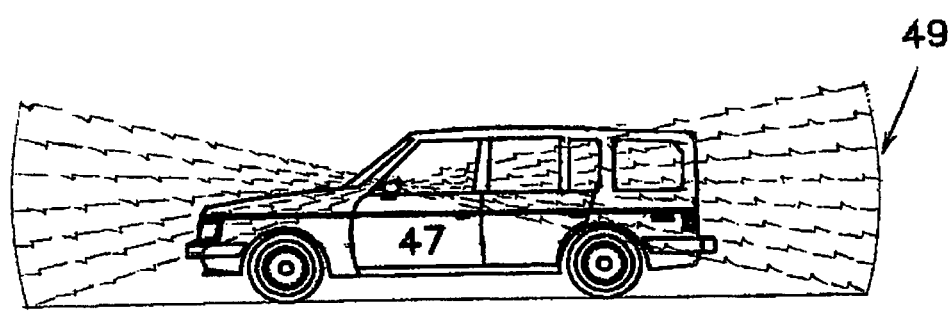
FIG. 21 is the side view of a vehicle illustrating the signal light pattern.

FIG. 21 depicts the vehicle (47) and the flashing of signal light pattern (49) from the side view.

Figure 22:
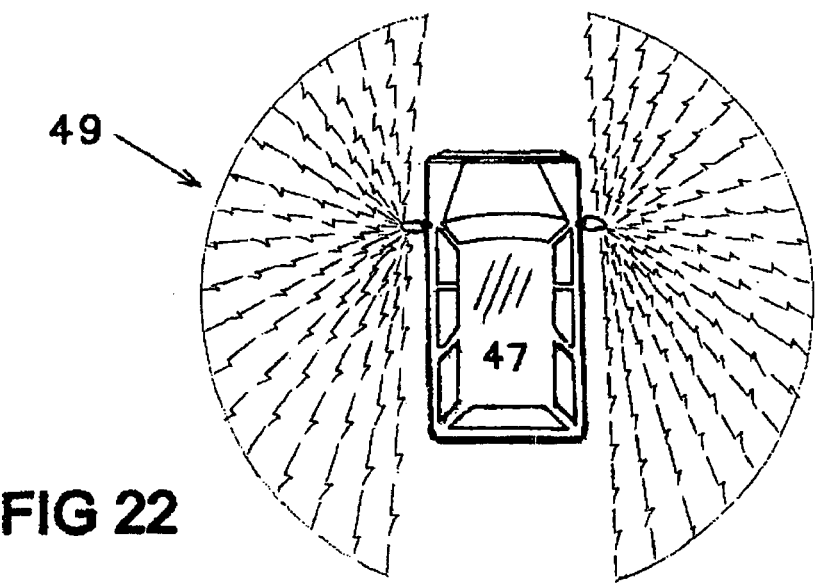
FIG. 22 is the schematic view of the signal light covering zones.

FIG. 22 is a top plan view of the vehicle (47) and the flashing signal light pattern (49).

Figure 23:
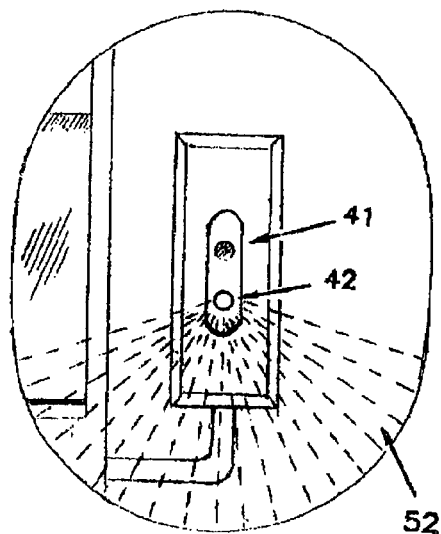
FIG. 23 indicates the front view of the safety light illuminating from the variation of the module of FIG. 18.

FIG. 23 shows a trailer installed with the invention with the module of pattern III. The light pattern and the covered zone of Pattern III (52) are indicated for the signal light of Pattern III (41) and the safety light of Pattern III (42).

Figure 24:
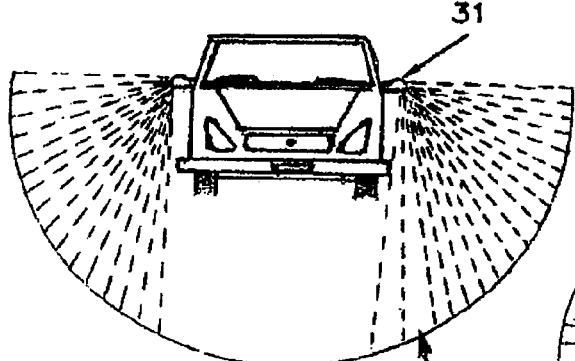
FIG. 24 shows that the safety light can be seen from the front view.
Figure 25:
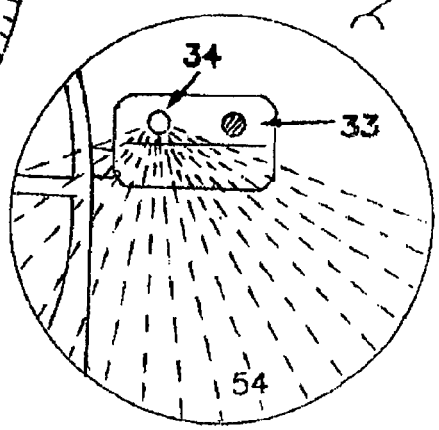

FIG. 24 shows the light pattern (53) generated by the safety light (31) from the invention, viewed from the front.

Figure 25:
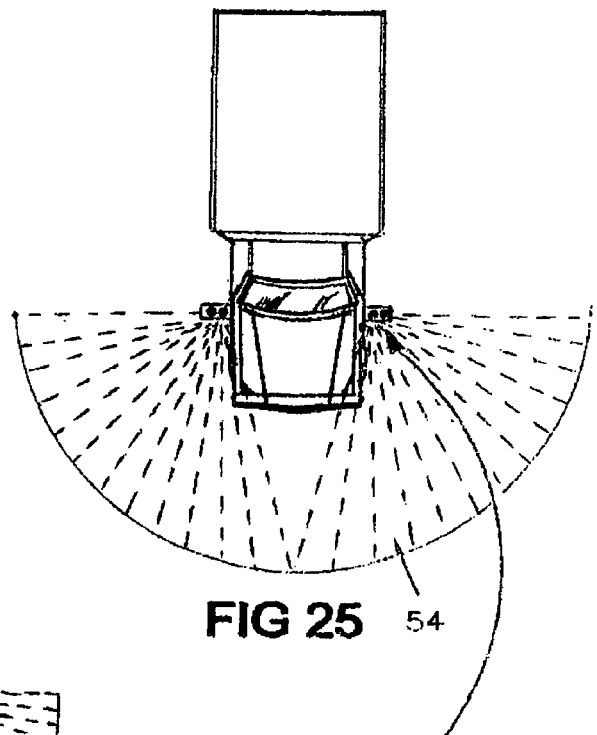
FIG. 25 illustrates the top view of the safety light illuminating from a truck.

FIG. 25 depicts a top plan view of a truck and a safety light pattern (54) and the covering zones.

FIG. 25A is the mirror with the Pattern IIa showing the safety light pattern (54), the signal light (33) and a signal light (34).

Figure 26:
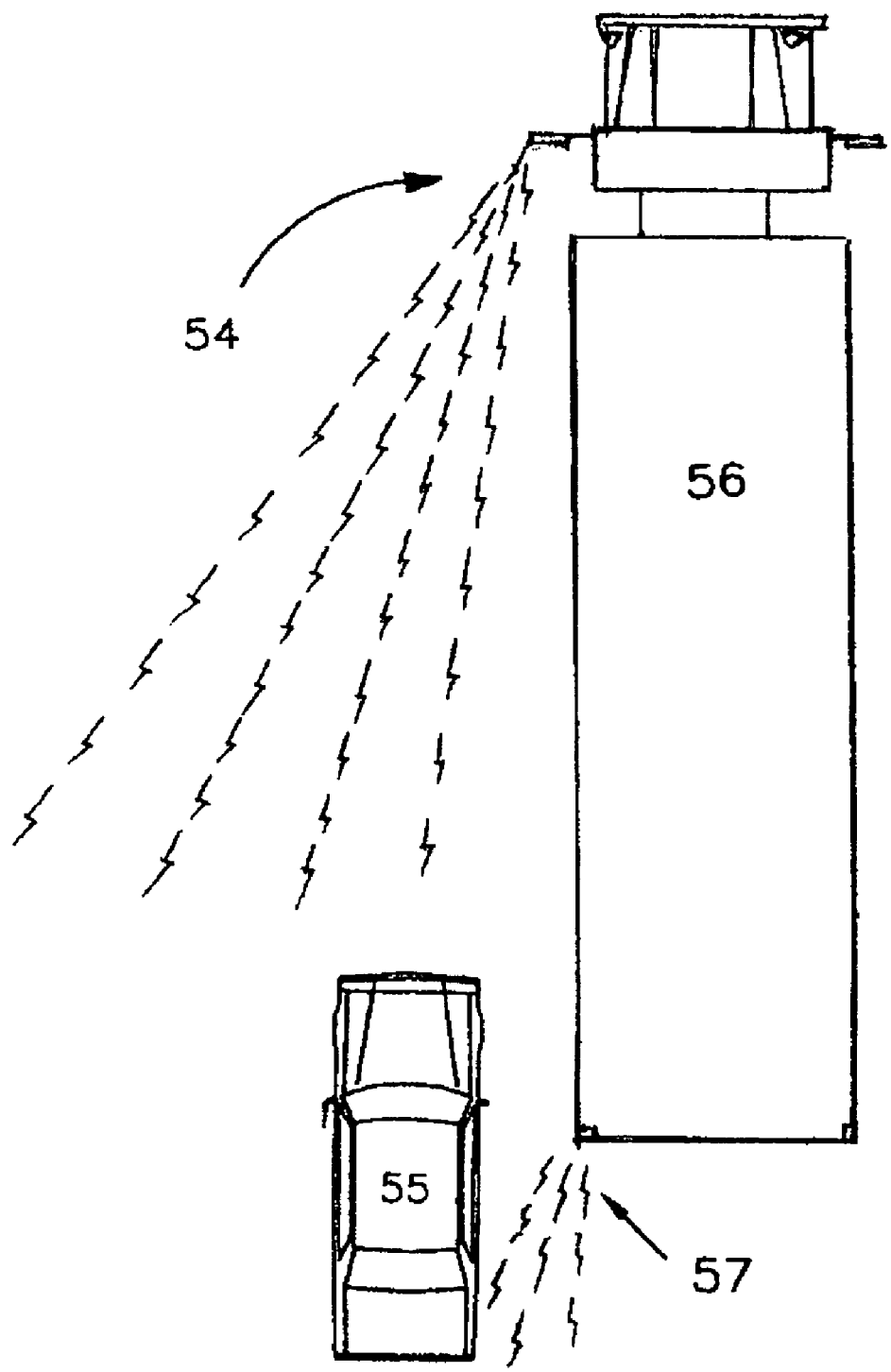
FIG. 26 illustrates how the signal light installed for trucks and trailers could save lives.

FIG. 26 shows the trailer (56) moving forward with the invention. One can observe that the vehicle (55) approaching the trailer at the rear of the trailer (56) can not notice that the trailer (56) is going to change lanes to the left as it has already passed over the rear signal covered area (57) of the trailer. The car is in a dangerous situation. If this trailer is installed with the invention, the driver of the car would have noticed the prewarning of the signal light Pattern (54). Thus a road tragedy would have been avoided.

Figure 27:
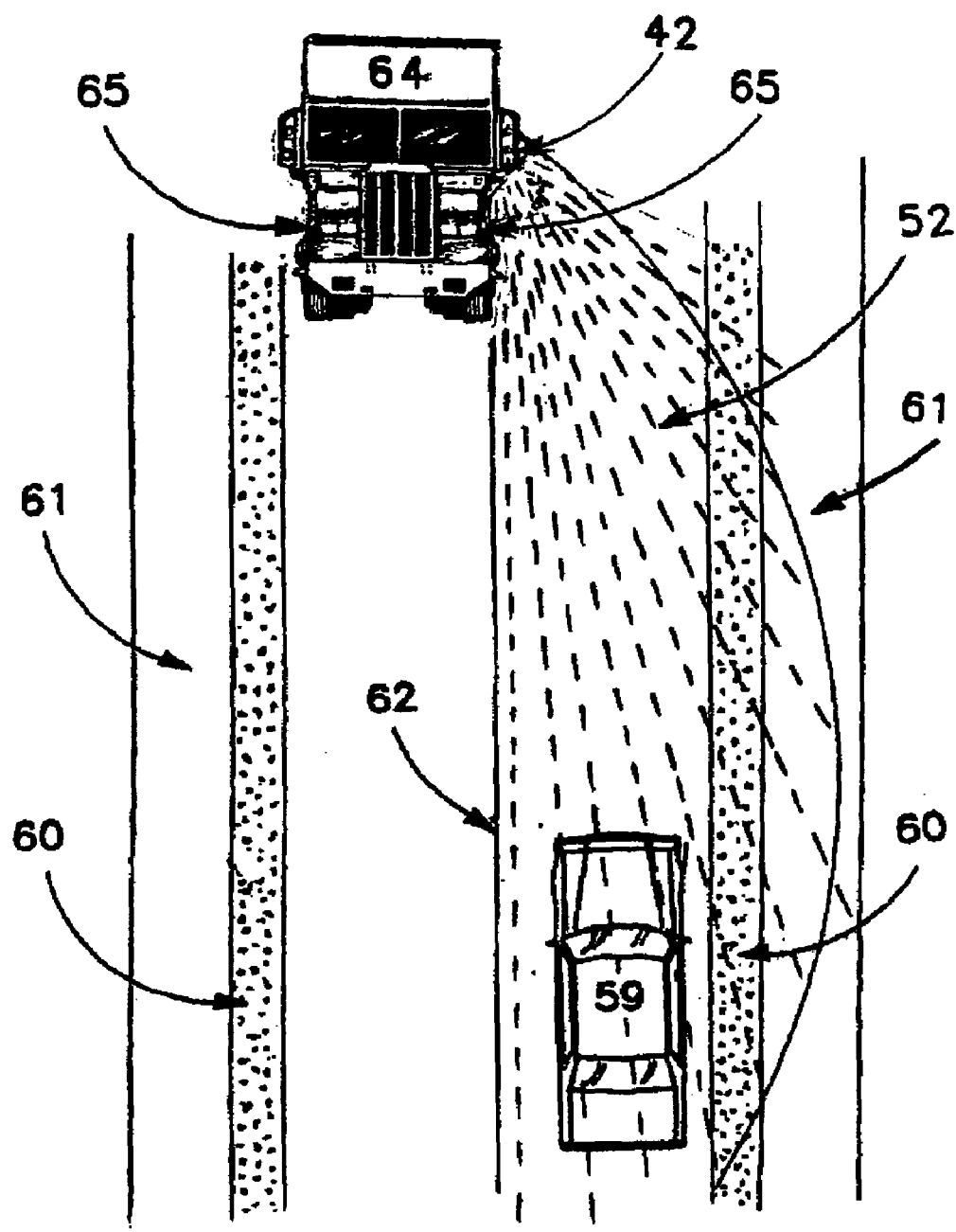
FIG. 27 illustrates how the safety light installed on trucks and trailers could help to avoid motor vehicle accidents.

FIG. 27 is demonstrating the contribution to road safety of the invention A car (59) is traveling forward along the outgoing lane on a two-way, two lane roadway system in one of the South East Asian countries. The road is comparatively well constructed with sand shoulder (60), grass area (61) and a road dividing line (62). There is always a risk for those who are traveling at night on this type of roadways. FIG. 27 shows a large trailer (64) with headlights (65) coming toward the incoming lane even encroaching a little into the opposite lane. It is fortunate that this trailer is installed with the invention with safety light (42) of Pattern III. The driver of the car (59) can observe the illumination covered zone (52) emitting from the safety light (42) of Pattern III. He was then aware that the coming vehicle was a giant and avoided him.

Figure 28A:
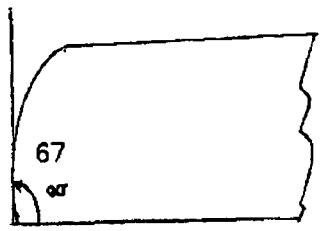
FIG. 28A shows the edge cover of the existing normal rearview mirror at about 90° bending curve.
Figure 28B:
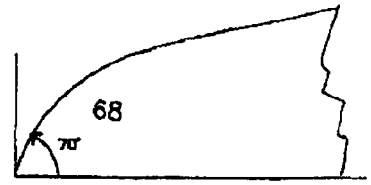
FIG. 28B shows the edge cover of the existing rearview mirror at about 70° bending curve.
Figure 28:
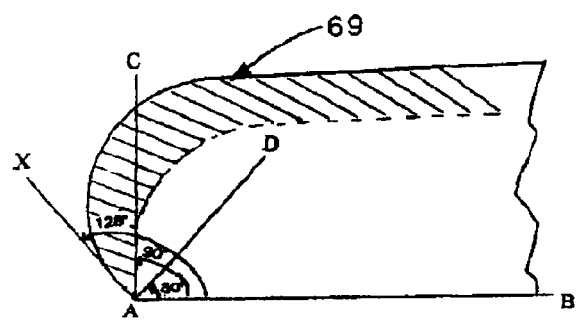
FIG. 28 indicates how the additional portion of the mirror cover is created between 91° and 180° for space to accommodate the signal light and safety light as a new pattern of vehicle mirror.

In FIG. 28, it is shown how the additional portion of the mirror cover (69) is created with at least a 128° curvature angle BAX for space to accommodate the signal light and safety light as a new designed rearview mirror for automobiles. We observe that the curve angle of the present rearview mirrors is between 90° angle BAC and 70° angle BAD as illustrated.

FIG. 28A shows an existing rearview mirror with a 90° angle (67).

FIG. 28B shows another existing rearview mirror with a 70° angle (68).

Figure 28C:
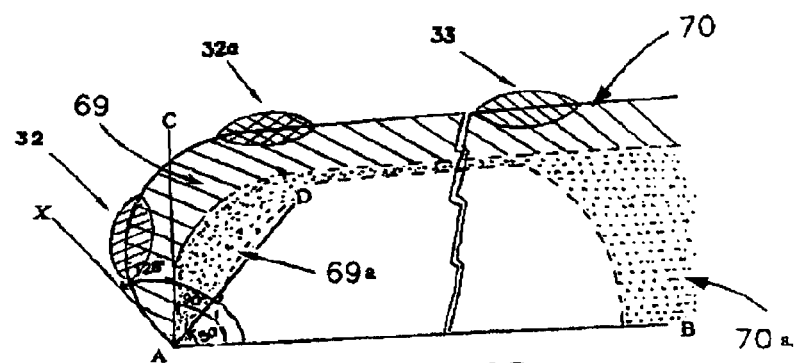
FIG. 28C indicates the existing space of the mirror and the created space for the mirror housing for mounting a module of signal light and safety light.
Figure 28D:
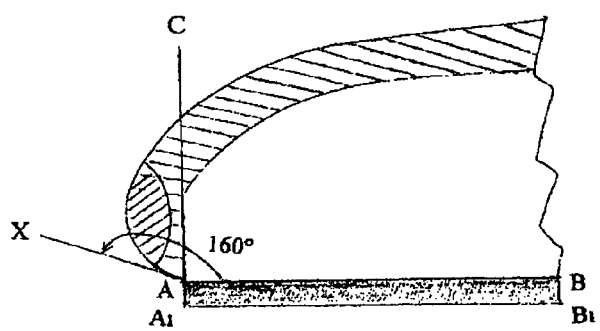
FIG. 28D depicts another variation of the mirror cover edge with a bending angle at least of 160 degrees.

The new design mirror cover enables the light to be seen from the rear, the side and the front of the vehicle. In order to achieve this aim, a mirror cover edge with an angle between 90° and 180° is created. Procedurally, first make a straight line AB, and a line AC of 90° angle. Then make a radius line base for the prospective curvature A D at 50° angle. Then use compass to try with the appropriate radius length say 1½ inch and settle at a point of the radius line AD and draw an arc curvature. If this arc curvature meets the requirement, then draw a tangent line AX and measure the angle of the curvature. It is 128°. Alternatively, one could predetermine the degree of the base angle of the curvature, say 135°, then draw the tangent line AX with 135° angle. The radius line AD could also be predetermined at 45°, 50° or 55° angle. Subsequently, use appropriate radius to -try until it meets the desire. FIG. 28C indicates the portion gained space through the creative of the wider angle mirror cover. The portion (69) is the space gained for the edge of the mirror cover and (70) is the space gained for the front cover. One can observe that there is existing empty space (69*a*) at the internal of edge cover and the internal space (70*a*) adjacent to the holder. These empty spaces are existing because of the mechanism and electronically controlled system is installed at the central of the mirror. With the created space (69) and (70) added to the existing empty spaces (69*a*) and (70*a*) of the mirror, it is more than sufficient room for the housing of the signal light and safety light mounting to the created hollow chamber at the mirror edge (69) without affecting the existing mechanism and electronic controlled system of the rearview mirror. When the invented signal light (32) with outlet (32*a*) is mounted to the hollow chamber cover edge (69), and the safety light (33) is mounted to the hollow chamber of the front cover (70), a composite mirror with pattern of signal and safety light system is completed.

FIG. 28 D depicts the angle of the mirror cover edge is increased at least to 160° for greater visibility from the rear. The area marked AB and $A_1B_1$ is the realm of the rearview mirror.

FIG. 29 depicts the perspective view and cross section view of the invention for Pattern I with the composite mirror (14) installed in the mirror cover (11). The new type LED bulb, Super Bolt Beam SJ828 and SJ848 are to be used for intense flashing of signal lights and magnificent illumination of safety lights for all the lights of the composite mirrors. These bulbs are the products of new technology, smaller in size, powerful and long life. Another advantage is that the bulb itself emits color beams of red, orange, yellow and white for choice. The number (30) indicates the signal light in Amber Red or Amber Orange color and (31) is the safety light cover in clear white or yellow color. The bulb for signal light is (73). It should be LED Super Beam SJ828. The light reflector (75) is for intense and brilliant illumination. The bulb for safety light is (74). It should be LED Super Beam SJ848. The light reflector (75) are for both the signal light (30) and the safety light (31). The means for supporting the bulb is (72). The divider between signal light and safety light is (76). (77) indicates the lighting system with a package module mounted to the edge corner of the hollow chamber (71). The wire socket (86) is also shown FIG. 29A shows the cross section top view of the module for a signal light wherein the bulb for signal light (73) is inside the signal light (30). The figure also shows the mirror cover (11), the lighting system with a package module (77), a wire socket (86) and the light reflector (75).

FIG. 29A-1 is a cross section top view of the module (77) for signal and safety light in which the two bulbs (73), of the signal light at upper compartment are shown. The safety light with the two bulbs (74) at the lower compartment are not seen. The signal light (30) and the safety light (31) in oval shape is extending further to the front cover and became a strap shape. This module is for pattern 1*a*, 1*b*, and 1*c*.

FIG. 29B illustrates the exploded perspective view of an integrated module of signal light (30) and safety light (31) assembly in accordance with the invention. The module (77) for signal light and safety light in three dimensional view is going to mount onto the mirror housing (71) of the composite mirror cover (11). The connecting point (77*a*) and wire connector (127) for connecting to the circuit of the vehicle through the panel base. The figure also shows a holder (12), a hanger (13), the composite mirror (14), and the wire socket (86).

FIG. 29C shows the designed connecting panel base with signal and safety light sockets (86*a*) and the easy installation of the rearview mirror and light power connection with the vehicle by connector (86*b*).

Figure 30:
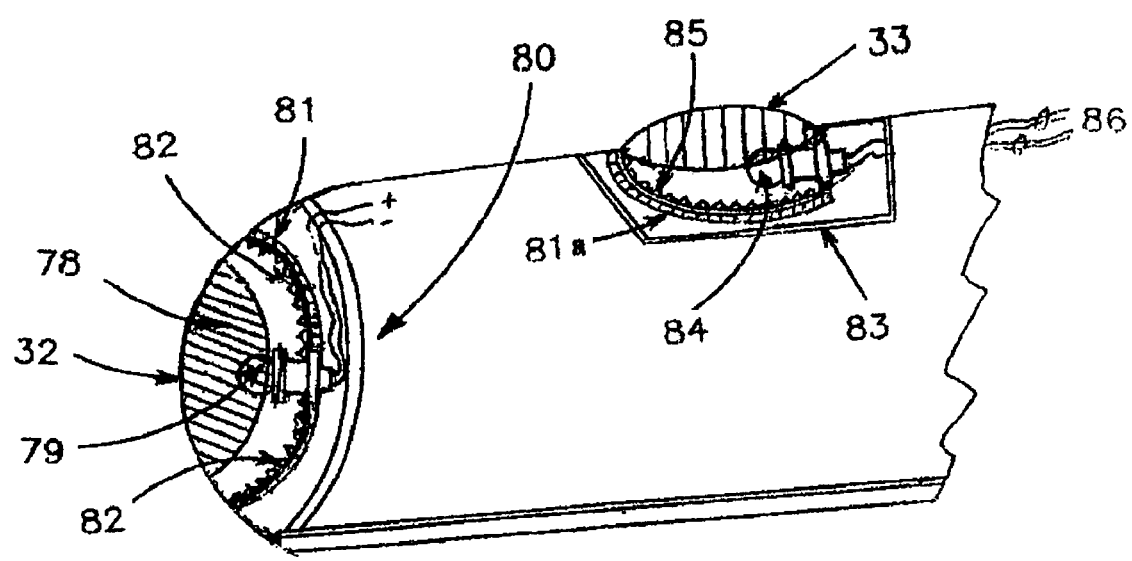
FIG. 30 is a perspective view and cross section view of the module of signal light and safety light according to Pattern II.
Figure 31:
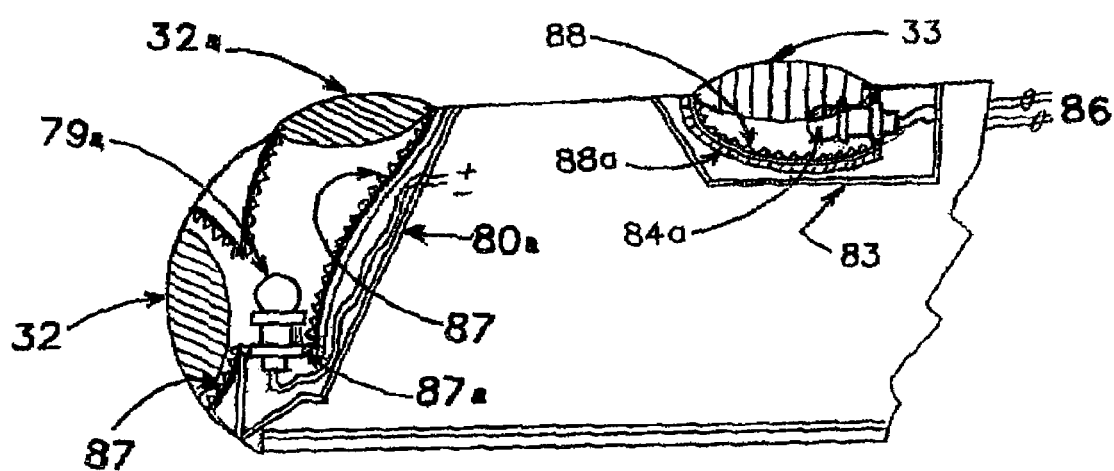
FIG. 31 is a perspective view and cross section view of the module of signal light and safety light providing two signal light outlets and one safety light outlet according to Pattern IIa.
Figure 32:
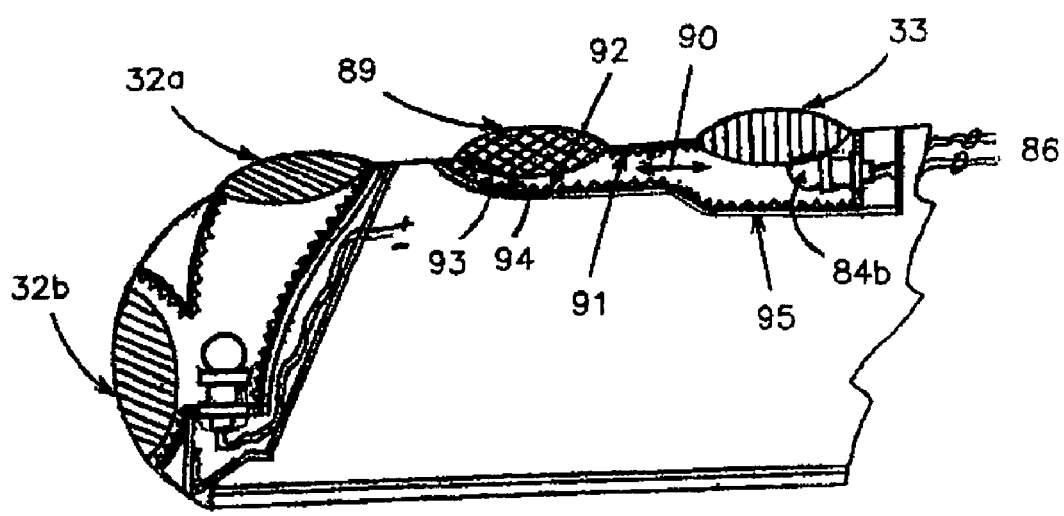
FIG. 32 indicates the front view and cross section view of the module of signal light and safety light providing two emitting outlets according to Pattern IIb.

FIG. 30 depicts the signal light (32) and safety light (33) are separately mounted to the cover edge and the interior of the front cover. In this module (80), the light cover (78) is in Amber Red or Orange color. The bulb for signal light (79) could be LED SJ828. The means for supporting the bulbs is (81) and (82) is the reflector elements for intense and brilliant illumination. The module is a separate unit (80) designed to be mounted to the chamber of the cover edge of the mirror housing. Whereas the safety light (33) in module (83) stands outstandingly in front. (84) is the light bulb and (85) is the reflector for intense illumination. The power wire (86) of the signal light and safety light are to be connected with the light switch circuit of the vehicle through the panel base of the vehicle as revealed earlier. This design is Pattern II and Other alternatives, for Pattern II are Pattern IIa and IIb which are depicted in FIG. 31 and FIG. 32 respectively. In addition to providing one long oval shape of signal light emitting outlet, we have provided two emitting outlets in round shape as a variation for aesthetical reason.

FIG. 31 is showing the round shape arrow image at the edge cover (32) and one round shape (32*a*) at the edge of the front cover. The round shape outlet at front adjacent to (32) having the same light source (79*a*). The colors for these two signal lights, one light (32) could be in Amber Red and another (32*a*) in Amber orange. The reflector elements for both outlets are indicated as (87). The means for the bulb is (87*a*). The bulb for signal outlets (32) and (32*a*) is LED Super Beam type. The module for this package is (80*a*). It is preferred for safety light outlet (33) to be in crystal white. The bulb for safety light is (84*a*) and the reflecting planar is (88) and the means is (88*a*). The module unit is (83) and (86) is the wire socket for connecting to the respective light switch circuit of the vehicle.

FIG. 32 provides an additional safety light outlet (89) between the signal light (32*a*) and the safety light (33) as another alternative as Pattern IIb. The light source for this light (89) in Amber yellow is from the bulb of the safety light though the long box shape light pipe (90). As indicated, along the light pipe (90), provides planar one side with plurality of faceted surfaces (91) for reflecting to the opposite side with clear reflector elements (92) and (93). This box shape light pipe (90) is a good channel for transmitting light to the outlet (89), especially by LED Super Beam bulb (84*b*) support by means (94). When the intense light shines on the reflectors (92) and (93) which are also in faceted surfaces would reflect the beam light and thus the light emitting out from outlet (89). With this design, the additional light (89) outlet is illuminated. The package module for this Pattern IIb is indicated (95) therein. The light Patterns II, IIa and IIb designed for the composite mirror for vans, cruisers and trucks are also applicable to the composite mirror for cars.

The module of signal light and safety light for buses and trailers is depicted in FIG. 33. It is shown a module unit (96) comprising a signal light (97) and safety light (98) is mounting to the central front housing of the mirror. The bulb of signal light for the central front is (101) and the bulb for the safety light is (102). The light reflector element for intense illumination are (103) and (104) for signal and safety light respectively. The glass cover for signal light (105) could be in Amber Red or Orange and for safety light (106) in clear white or yellow by using high brightness LED for magnificent effect.

In FIG. 33A indicates a separate unit of signal light, the preferred color for signal light (40) is in Amber Red mounting to the side of composite mirror for buses and trailers. The signal bulb of the rear signal is (99) and the reflecting element is (100). The supporting means is (100a). Again (86) is the wire socket provided for connecting to the respective light switch circuit of the vehicle. This design is pattern III of the invented lighting system for the composite mirror.

Figure 33B:
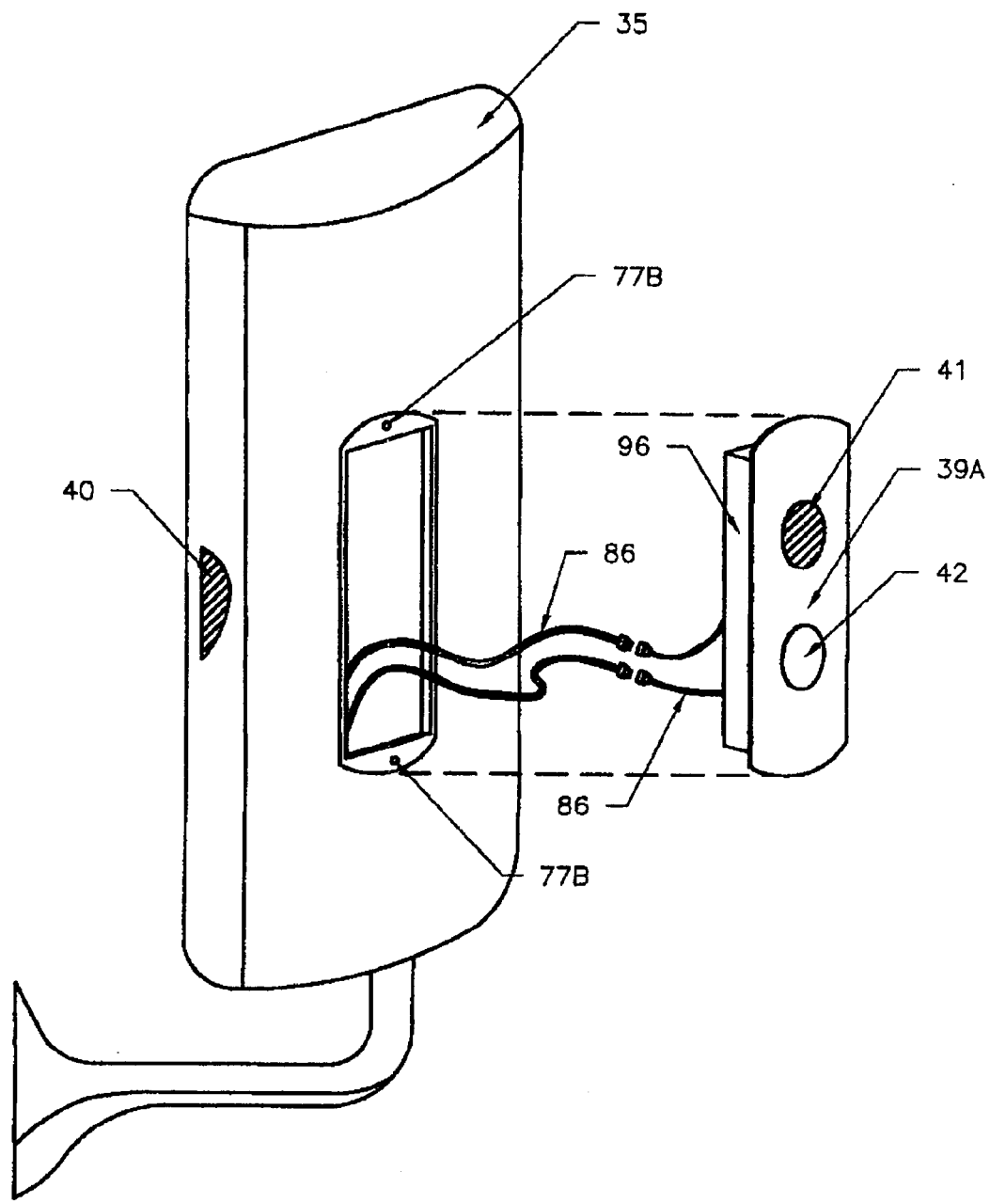
FIG. 33B shows the module of signal and safety lights as an integrated part of assembly mounting to the front cover of the rearview mirror for trailers and other large vehicles.

FIG. 33B illustrates the module of signal light and safety light of a rearview mirror for heavy vehicles in which (39A) as an integrated part is mounting to the hollow housing of the rearview mirror. Within the module, (41) is the signal light and (42) is the safety light. The electrical wires for connecting to vehicle are (86). The module will be tied with the mirror cover by strews at the two points (77B). The mounting of the side signal light (40) is similar and simple. When the respective wires connected the respective circuits of the vehicle, through the base panel of vehicle, this outstanding, most effective safety device is firmly established. Also shown are the module (96) and the rectangular edge cover (35).

Figure 34:
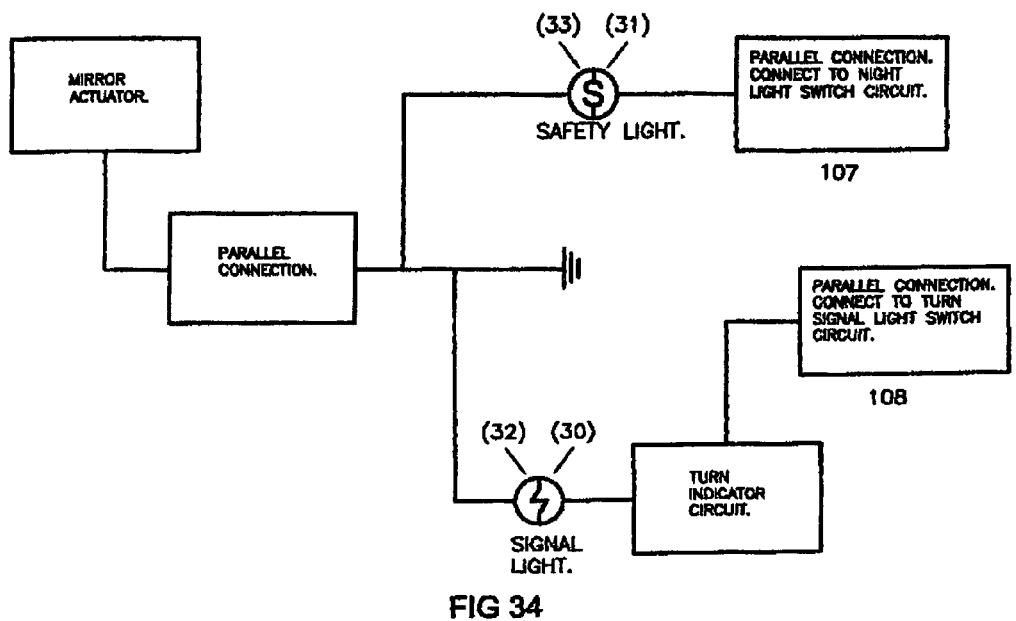
FIG. 34 indicates the block diagram of an electrical control system for signal light and safety-light of Pattern I, Ia, Ib, Ic, II, IIa, IIb and IIc.

The diagram at FIG. 34 shows the block diagram of electrical control system for the signal light and safety light each with one bulb as one system. Therein (30) is the signal light and (31) is the safety light. Therein also indicated that (32) is signal light and (33) is safety light for lighting system for trucks, cruisers and vans. Therefore, this diagram is applicable to Patterns I, II, IIa and IIb. This diagram is for both left and right side of the composite mirror for cars, vans, cruisers and trucks. The paralleled connection of power source from the vehicle is through the wire sockets provided at the base panel for nicely fixed to the respective type of vehicles. The designs and sizes of the base panel would be arranged by the mirror manufacturer and the automobile company using the invented rearview mirror. A parallel connection to the night light switch circuit is (107) and a parallel connection to the signal light switch circuit is (108). The replica is for the right side of the mirror.

Figure 35:
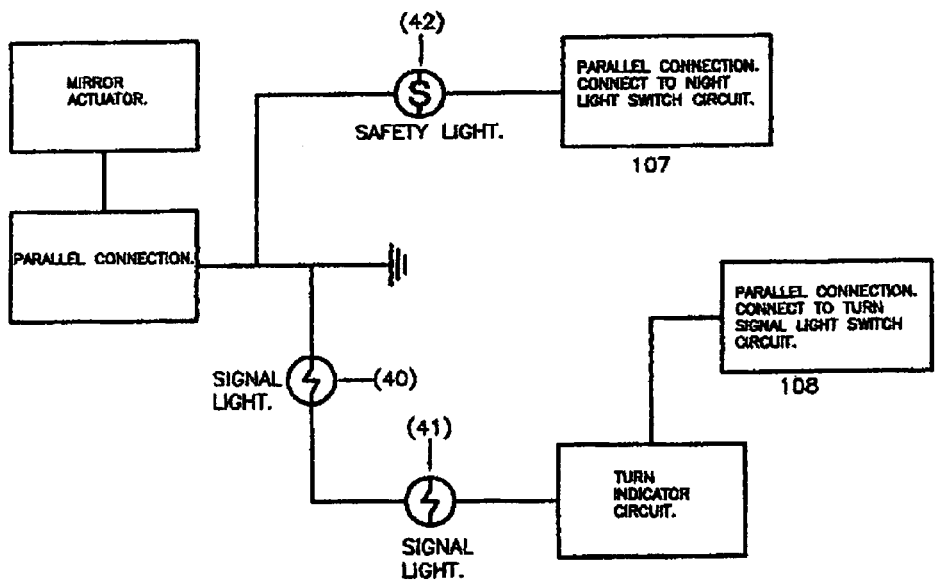
FIG. 35 indicates the block diagram of an electrical control system for two signal lights and one safety light system of Pattern III for buses, trailers and other large vehicles.

FIG. 35 depicts the electrical control system for two modules, one for signal light (40) and another with signal light (41) and safety light (42). This diagram is applicable to the lighting system of two bulbs of signal lights and one bulb of safety light which is the Pattern III. It is also applicable to Pattern I with two bulbs of signal lights and two bulbs of safety lights by adding one safety light socket. A parallel connection to night light switch circuit is (107) and a parallel connection to the signal light switch circuit is (108). The replica is for the right side of the mirror.

As stated earlier, the objective of this invention is to save lives by providing a multifunctional device for safety driving as well as riding. The road accidents involved motorcycles and scooters in the South East Asia and other developing countries were and are sickening and awful. On the roads, there are approximately 30%–60% of motorcycles and scooters plying day and night. In United States and other well developed countries, motorbikes are only used as riding pleasure in group trips for country sight seeing during spring and summer time. Whereas in those developing countries, the motorcycles and scooters are the convenient and affordable transport for the working class and low income groups. The more motorcycles on the roads the more traffic accidents occurred. It has been recognized that the frequent accidents involved the riders, apart from other reasons, the defects of the signal lights which were lowly installed at the rear is one, the blind spot of the rearview mirror is another cause. In most of the accidents, the riders and sometimes, with co-riders, the wives or girlfriends were knocked down and rolled over by cars, vans or trucks resulting in the blood and flesh spread on the roads. This is partly due to the blind spot of the rearview mirror and the unawareness of the car or truck driver that the motorcycle at the front side lane is going to make a lane change as the signal lights of the motorcycle are lowly installed beside the number plate. The motorcycle and scooter riders with co-riders or passengers while changing lane, sometimes turned into the big wheel of a 4-wheel towing deck behind a 10-wheel truck or 18-wheel trailer due to the blind spot of the rearview mirror. One could imagine what scary and loathsome scene when the wheels rolled over the motorbike and bodies of the rider and co-rider. This kind of tragedy keeping repeating until now. No one suggested anything to remedy the situation but only blamed the riders for their non-alertness and non-cautiousness.

In fact, these kinds of tragedies could be avoided, if the motorcycles and scooters are equipped with the composite mirror incorporated with signal and safety lights highly installed. The present invention could serve the purpose of life-saving and safety riding of motorbikes and scooters.

Figure 36:
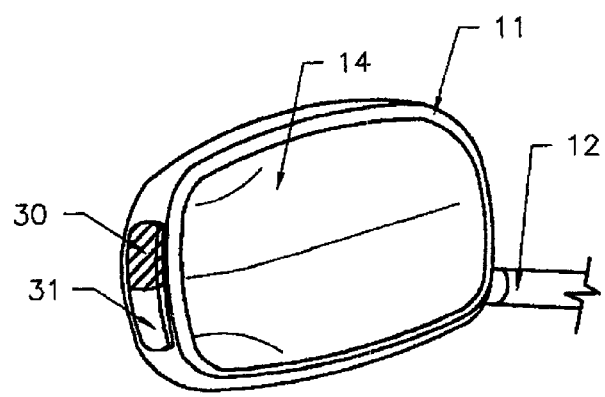
FIG. 36 depicts the side view with a variation of signal and safety light system for motorcycles and scooters.

The designed patterns of the present invention for motorcycles and scooters are depicted in FIG. 36 as Pattern IV. Shown are the composite mirror (14), the mirror cover (11), the holder (12) the signal light (30) and the safety light (31).

Figure 36A:
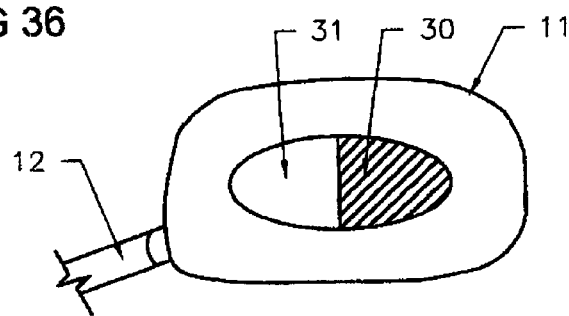
FIG. 36A shows a variation of the module for signal and safety light.

FIG. 36A shows another alternative with the mirror cover (11), the holder (12), the signal light (30) and the safety light (31).

Figure 36B:
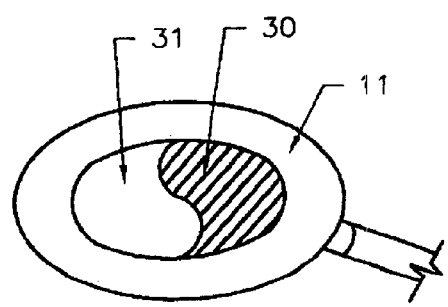
FIG. 36B shows another variation of the module for signal and safety light.

FIG. 36B shows another alternative with the mirror cover (11), the signal light (30) and the safety light (31).

Figure 36C:
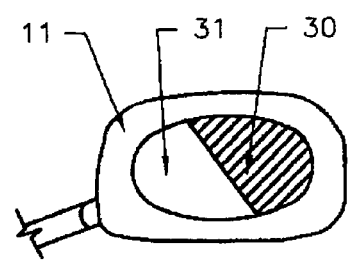
FIG. 36C shows another variation of the module for signal and safety light.

FIG. 36C shows another variation of the signal light (30) and the safety light (31).

Figure 37:
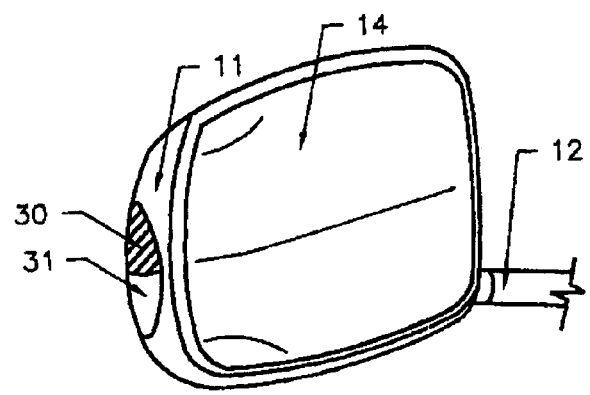
FIG. 37 depicts another side view of the invented mirror for motorcycles and scooters.

FIG. 37 shows another variation of the pattern IV with the composite mirror (14), the mirror cover (11). the holder (12), the signal light (30) and the safety light (31).

Figure 37A:
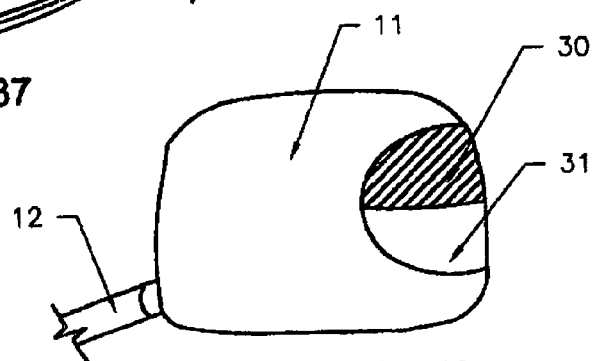
FIG. 37A is another variation of the module for signal and safety light for motorcycles and scooters.

FIG. 37A shows the pattern similar to earlier pattern I with the mirror cover (11), the holder (12), the signal light (30) and the safety light (31).

Figure 37B:
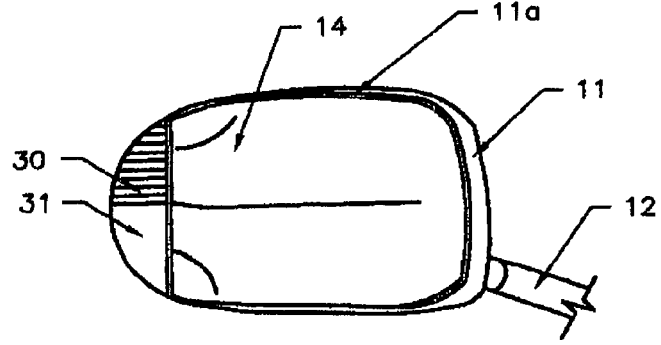
FIG. 37B shows a rear view of the designed module of signal and safety light of Pattern IV.

FIG. 37B is the rear view of the module of signal light and safety light for pattern IV. The curvature angle of the mirror cover edge has been increased to at least 160° for greater visibility. This design will enhance the safety for motorcycles and scooters and reciprocally, applicable to motor vehicles. Apparently, the mounting of the module of signal and safety lights is simple as more space is available since the rearview mirrors have no mechanism installed for judging the mirror. The electrical wires for the signal light and safety light could follow the diagram in FIG. 34 and FIG. 35 respectively for connecting to the circuits of the motorcycles and scooters. With the installation of this multifunctional device, the composite mirror (14) with signal (30) and safety light (31), the riding safety can be greatly enhanced. Also shown are the mirror cover (11) cover realm (11a) and the holder (12).

A plurality of designs of mirrors in accordance with the present invention with different sizes and different patterns made suitable for various types of vehicles, such as cars, cruisers, vans, trucks, buses, trailers and motorcycles and scooters are contemplated. The added functions of the rearview mirror with signal light and safety light system is a contribution to the road safety of the vehicles and other road users.

The construction of mirrors in accordance with the invention could be done by a computer program, such as the computer Solid Works Program. When the shape and curvature of the mirror meet desired requirements, then a mold and prototype for production can be produced. The construction of the module for signal and safety light system could also be done on Solid Works Programs. When the measurement and shape meet the design pattern, then build mold and prototype for production of the module as part of the mirror assembly.

Mirrors in accordance with the present invention may be installed for new vehicles by the car companies with a reasonable cost. The real cost of the Wide Range Rearview Mirror could be the same as the existing flat rearview mirrors. The additional cost is the provision of the designed signal and safety light system to the mirror.

There may be additional cost for manufacturing mirrors in accordance with this invention. However, by installing this rearview mirror, vehicle drivers and motorcycle riders could receive the added benefit of the improved safety and convenience. The benefits of installing mirrors in accordance with the present invention are believed to be are greater than the simple one to one correspondence to the increase of manufacturing cost. Thus, an increase in cost of manufacturing of the mirror in accordance with the present invention yields greater benefit, in terms of safety, life and property lost. The claims of insurance in accidents are tremendous as well as the time lost and the cost involved in court proceedings and police investigations. Mirrors in accordance with the present invention constitute a fine tuned multifunctional safety device designed with the computer Curve Fitting Program. Scientifically, the present invention is believed to be the best and the most effective device for safety driving and riding. Apparently, it is a breakthrough model. It is a unique and complete safety device covering the blind spot with negligible distortion, equipped with signal and safety light system. Apart from enhancing the driving and riding safety, it could also upgrade the aesthetic and functional value of the vehicle. This invented elegant safety device could provide a good choice to the automobile industry and the public.

All the drawings are for illustration purposes and not for defining the invention disclosed as the present invention could have modifications and variations within the spirit and art of the invention.

I make the following claims:

1. A signal and safety light system for an exterior wide range rear view mirror of the left side and the right side of a vehicle having:
  a mirror cover having an interior and an exterior and having two sides;
  a holder is attached to one side of said mirror cover;
  said holder is then attached to a hanger that attaches to a vehicle and with a created curvature mirror cover edge at least 128 degrees between 91 degrees and 180 degrees;
  a hollow chamber on the other side of said mirror cover for accommodating a module;
  said module consists of two compartments forming a light system;
  a first compartment including a signal light and the second compartment containing a safety light;
  said chamber having a means for supporting said light system positioned vertically;
  said compartments having a reflector and a light source;
  said mirror cover having a composite mirror attached to the interior of said mirror cover;
  said composite mirror having a ¼ (25%) curvature reflective mirror in combination with ¾ (75%) flat reflective mirror;
  said curvature reflective mirror composite to said flat reflective mirror at a bending curve angle between 2 degrees and 7 degrees with a curvature radius of between 16 and 19 inches; said composite mirror positioned such that the flashing of signal light and the illumination of safety light could be seen from the rear, the side and the front.

2. The signal and safety light system incorporated with the Wide range rearview mirror of claim 1 wherein the created bending curvature angle between 91 degrees and 180 degrees for the rearview mirror cover edge for mounting of a module of signal light, safety light or signal and safety lights is a prior art.

3. A signal and safety light system incorporated with an exterior rearview mirror according to claim 1, wherein said mirror cover edge is created between 91 degrees and 180 degrees, preferably with an angle of 128 degrees.

4. A signal and safety light system incorporated with an exterior rearview mirror according to claim 1, wherein said curvature reflective mirror is composite to said flat reflective mirror at a bending curve angle of 2.5 degrees with a curvature radius of between 16 and 19 inches.

5. A signal and safety light system incorporated with the exterior Wide Range Rearview Mirror of claim 1 the mirror of which is not convex surface but with plane reflective surface sprayed with water proof transparent scotch guard.

6. The signal and safety light system incorporated with the Wide Range Rearview Mirror of claim 1 could be in any shapes, round, oval, square, rectangle or strap manufactured in various sizes and pattern variations for use in cars, vans, trucks, cruisers, buses, trailers and motorcycles and scooters.

7. A signal and safety light system incorporated with an exterior rearview mirror according to claim 1, wherein said module of lights is in an oval square, or strap shape as pattern I.

8. A signal and safety light system incorporated with the Wide range rearview mirror of claim 1, wherein the module of the signal and safety lights with two bulbs extended further to the front cover in strap shape is pattern Ia.

9. The signal and safety light system incorporated with the Wide range rearview mirror of claim 1 with module of signal and safety lights in strap shape mounted to the lower part of the front cover of the mirror as pattern 1b and the said module mounting onto the upper part of the front cover as pattern 1c.

10. A signal and safety light system incorporated with an exterior rearview mirror of claim 1 with signal light mounted to the edge cover housing and with one safety light in round shape mounted onto the front of the mirror as Pattern II.

11. A signal and safety light systems incorporated with exterior Rearview Mirror of claim 1 having two signal light outlets in round shape from one light source with one in a arrow image, mounted to the edge of mirror cover housing and one safety light in round shape mounted to the front mirror cover respectively as Pattern IIa.

12. A signal and safety light system incorporated with the Wide Range Rearview Mirror of claim 1 wherein the two signal light outlets from one light source are in round shape with one arrow image, and two safety light outlets from one light source in front of the mirror cover in round shape Pattern IIb.

13. A signal and safety light system incorporated with the Wide Range Rearview Mirror of claim 1 wherein the signal lights and safety lights are arranged in one module in strap shape mounting onto the center part, in variation, the lower part or the upper part of the front cover of the mirror as Pattern IIc.

14. A special designed signal and safety light system incorporated with the big size of Wide Range Rearview Mirror of claim 1 with one module of signal light and another module of signal and safety light in variations with one in round shape, oval shape and other in rectangle shape respectively mounted onto the edge cover mirror housing and the front cover mirror housing of the mirror invented for buses, trailers and other heavy vehicles as Pattern III.

15. A signal and safety light system of claim 1 incorporated with the conventional exterior flat rearview mirror or curve rearview mirror in various patterns for cars, vans, pickups, cruisers, buses, trailers, heavy vehicles and motorcycles and scooters is governed under this inventions.

16. The replica of the exterior Wide Range Rearview Mirrors of claim 1 with curvature mirror at the right side incorporated with signal and safety lights in various patterns is for the right side of the motor vehicles, motorcycles and scooters.

17. A created signal and safety light system incorporated with the Wide Range Rearview Mirror of claim 1 a variation in design for the module in oval shape equally compartmentalizing for signal light and safety light mounting onto the front cover mirror housing of the rearview mirror as Pattern IV in three variation designs for motorcycles are reciprocally applicable to vehicles.

18. A signal and safety light system incorporated with the Wide Range Rearview Mirror of claim 1 for motorcycles and scooters of which the created wide angle mirror cover edge is increased to at least 160 degrees for greater visibility from the rear.

19. A side curvature Mirror created by separating the ¼ portion of curvature mirror from the Wide Range Rearview Mirror of claim 1 as an independent piece of curvature side mirror for sticking respectively onto the edge of the left side and the right side of the existing flat rearview mirror.

* * * * *